(12) United States Patent
Bae et al.

(10) Patent No.: US 10,606,460 B2
(45) Date of Patent: Mar. 31, 2020

(54) ELECTRONIC DEVICE AND CONTROL METHOD THEREFOR

(71) Applicant: Samsung Electronics Co., Ltd., Suwon-si, Gyeonggi-do (KR)

(72) Inventors: Jong-Kon Bae, Seoul (KR); Yo-Han Lee, Seoul (KR); Dong-Hui Kim, Hwaseong-si (KR); Dong-Kyoon Han, Seongnam-si (KR); Hanyuool Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/094,109

(22) PCT Filed: Apr. 20, 2017

(86) PCT No.: PCT/KR2017/004252
§ 371 (c)(1),
(2) Date: Oct. 16, 2018

(87) PCT Pub. No.: WO2017/183930
PCT Pub. Date: Oct. 26, 2017

(65) Prior Publication Data
US 2019/0129601 A1   May 2, 2019

(30) Foreign Application Priority Data

Apr. 20, 2016  (KR) .................. 10-2016-0048329

(51) Int. Cl.
*G06F 3/0484*   (2013.01)
*G06F 21/84*   (2013.01)
(Continued)

(52) U.S. Cl.
CPC ........ *G06F 3/04845* (2013.01); *G06F 3/0488* (2013.01); *G06F 21/6245* (2013.01);
(Continued)

(58) Field of Classification Search
CPC .................................................. G06F 3/04845
See application file for complete search history.

(56) References Cited

U.S. PATENT DOCUMENTS 6,058,207 A  *  5/2000  Tuijn ..................... H04N 1/622
                                                          358/518
8,502,780 B1 *  8/2013  Park .................... G06F 3/04886
                                                          345/165

(Continued)

FOREIGN PATENT DOCUMENTS

EP            2 996 409 A1    3/2016
KR      10-2008-0060822 A     7/2008
(Continued)

OTHER PUBLICATIONS

Extended European Search Report dated May 8, 2019, issued in European Patent Application No. 17786198.6.

*Primary Examiner* — Phi Hoang
(74) *Attorney, Agent, or Firm* — Jefferson IP Law, LLP

(57) ABSTRACT

An electronic device according to various embodiments of the present invention may comprise: a display; a processor for generating a frame image; and a display driving circuit for driving the display, the display driving circuit including an image processing module and a memory, wherein the display driving circuit is configured to acquire the frame image from the processor, generate a different frame image by applying a designated effect to at least a partial area of the frame image, and display the different frame image through the display.

15 Claims, 31 Drawing Sheets

(51) Int. Cl.
*H04M 1/725* (2006.01)
*G06F 21/62* (2013.01)
*G06F 3/0488* (2013.01)
*H04N 1/00* (2006.01)
*G09G 3/00* (2006.01)

(52) U.S. Cl.
CPC ............ *G06F 21/84* (2013.01); *G09G 3/003* (2013.01); *H04M 1/725* (2013.01); *H04N 1/00872* (2013.01); *G06F 3/04886* (2013.01); *G06F 2221/032* (2013.01); *G09G 2320/0666* (2013.01); *H04M 1/72552* (2013.01); *H04M 1/72555* (2013.01)

(56) References Cited

U.S. PATENT DOCUMENTS

| | | | |
|---|---|---|---|
| 10,338,673 B2* | 7/2019 | Chen | G06K 9/00362 |
| 2008/0025645 A1 | 1/2008 | Jakobson et al. | |
| 2010/0214324 A1 | 8/2010 | Broughton et al. | |
| 2010/0259560 A1 | 10/2010 | Jakobson et al. | |
| 2012/0131471 A1 | 5/2012 | Terlouw et al. | |
| 2014/0157424 A1* | 6/2014 | Lee | G06F 21/74 |
| | | | 726/26 |
| 2014/0327634 A1 | 11/2014 | Kim et al. | |
| 2015/0213274 A1 | 7/2015 | Xu et al. | |
| 2015/0294627 A1 | 10/2015 | Yoo et al. | |
| 2016/0225337 A1* | 8/2016 | Ek | G09G 5/003 |
| 2016/0239649 A1* | 8/2016 | Zhao | G06F 21/316 |

FOREIGN PATENT DOCUMENTS

| | | |
|---|---|---|
| KR | 10-2011-0108647 A | 10/2011 |
| KR | 10-2015-0062401 A | 6/2015 |
| KR | 10-2015-0090840 A | 8/2015 |
| KR | 10-2015-0118721 A | 10/2015 |

* cited by examiner

ELECTRONIC DEVICE AND CONTROL METHOD THEREFOR

CROSS-REFERENCE TO RELATED APPLICATION(S)

This application is a U.S. National Stage application under 35 U.S.C. § 371 of an International application number PCT/KR2017/004252, filed on Apr. 20, 2017, which is based on and claimed priority of a Korean patent application number 10-2016-0048329, filed on Apr. 20, 2016, in the Korean Intellectual Property Office, the disclosure of which is incorporated by reference herein in its entirety.

BACKGROUND

1. Field

Various embodiments of the present invention relate to electronic devices, e.g., electronic devices that display portions of images, and methods for controlling the same.

2. Description of the Related Art

There have recently been disclosed techniques that enable users to view various photos or videos on their smartphones and to perform financial work through financial applications (e.g., bank applications).

Users may enjoy various types of content on their smartphones or run a diverse set of applications, and they may view their desired information on the display regardless of whether they are at home, work places, or in public places that many people enter or exit.

SUMMARY

According to the prior art, when very personal information (e.g., the content of messages, a security card serial number, etc.) is displayed on the display of a smartphone, the smartphone user is put at risk because their personal information is exposed in public places where many people are, and the content displayed on the smartphone can be shown to others. Thus, the user cannot do anything except to hide the smartphone with their hand or to view the personal information-containing content or application in a private place, rather than in a public place.

According to various embodiments of the present invention, there may be provided an electronic device that may apply a privacy effect to images that are output on the smartphone based on information displayed through the display of the smartphone or the ambient environment of the smartphone.

According to various embodiments of the present invention, an electronic device may comprise a display, a processor configured to generate a frame image, and a display driver integrated circuit (IC) including an image processing module and a memory and that is configured to drive the display, wherein the display driver IC is configured to obtain the frame image from the processor, generate another frame image by applying a specified effect to at least a portion of the frame image, and display the other frame image through the display.

According to various embodiments of the present invention, a method for controlling an electronic device may comprise obtaining a frame image, generating another frame image by applying a specified effect to at least a portion of the frame image, and displaying the other frame image.

According to various embodiments of the present invention, the electronic device may display images only in a manner such that information output from the display of the smartphone is shown only to the user who is viewing the display in front of the front surface of the smartphone depending on the ambient environment of the smartphone or on the information displayed on the smartphone, thus allowing the user to see their personal information on the smartphone without minding others.

DETAILED DESCRIPTION

Figure 1:
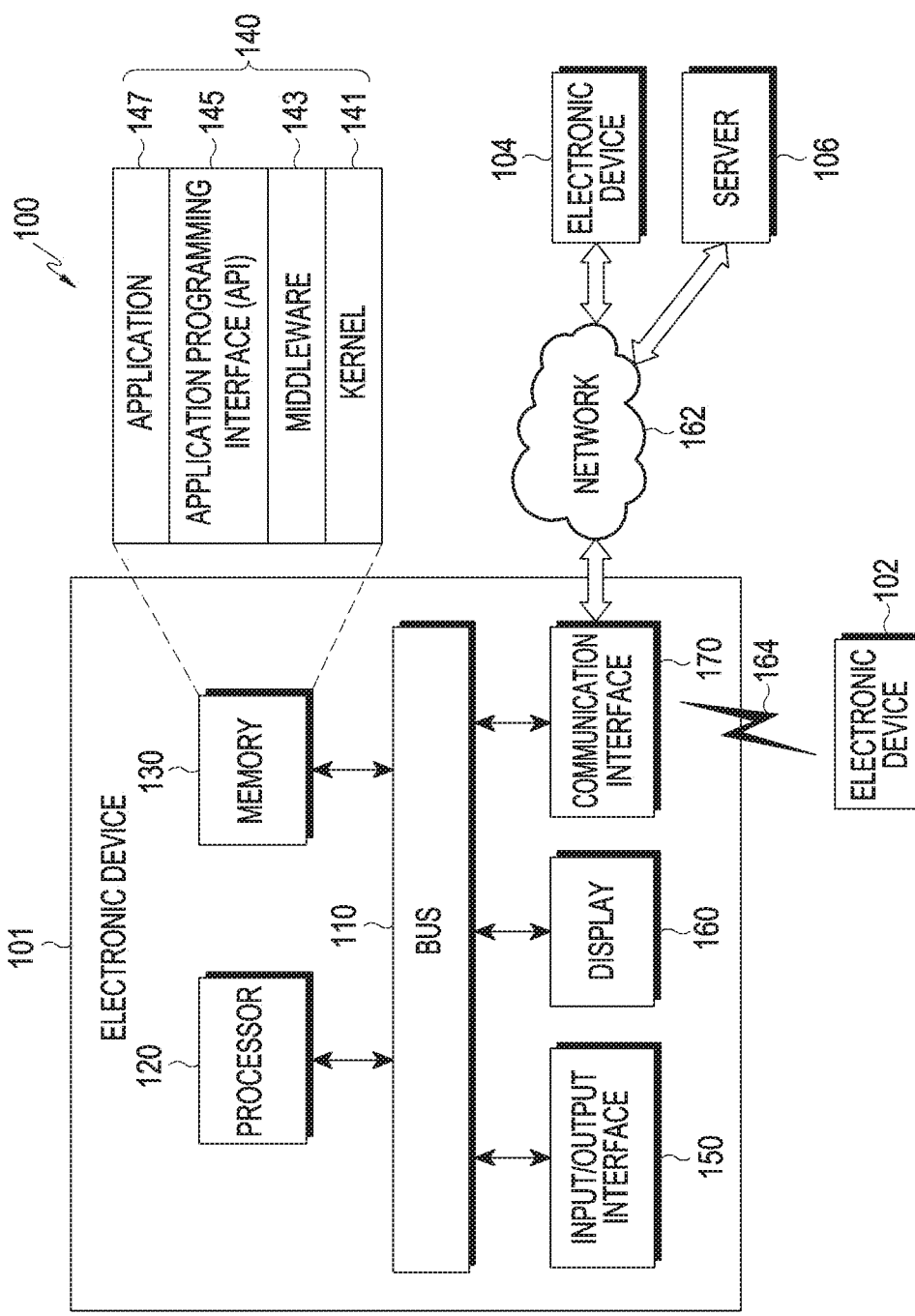
FIG. 1 is a view illustrating a use environment of a plurality of electronic devices according to an embodiment of the present invention.

Hereinafter, embodiments of the present invention are described with reference to the accompanying drawings. However, it should be appreciated that the present invention is not limited to the embodiments and the terminology used herein, and all changes and/or equivalents or replacements thereto also belong to the scope of the present invention. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present invention may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present invention, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the invention, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present invention, the electronic device may be flexible or may be a combination of the above-enumerated electronic devices. According to an embodiment of the invention, the electronic devices are not limited to those described above. As used herein, the term "user" may denote a human or another device (e.g., an artificial intelligent electronic device) using the electronic device.

Referring to FIG. 1, according to an embodiment of the present invention, an electronic device 100 is included in a network environment 101. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present invention, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external electronic device (e.g., a first electronic device 102, a second electronic device 104, or a server 106). For example, the communication interface 170 may be connected with the network 162 through wireless communication 164 or wired communication to communicate with the external electronic device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UNITS), wireless broadband (WiBro), or global system for mobile communication (GSM). According to an embodiment of the present invention, the wireless communication may include at least one of, e.g., wireless fidelity (Wi-Fi), bluetooth, bluetooth low power (BLE), zigbee, near field communication (NFC), magnetic secure transmission (MST), radio frequency, or body area network (BAN). According to an embodiment of the present invention, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present invention, all or some of operations executed on the electronic device 101 may be executed on another or multiple other electronic devices (e.g., the electronic devices 102 and 104 or server 106). According to an embodiment of the present invention, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
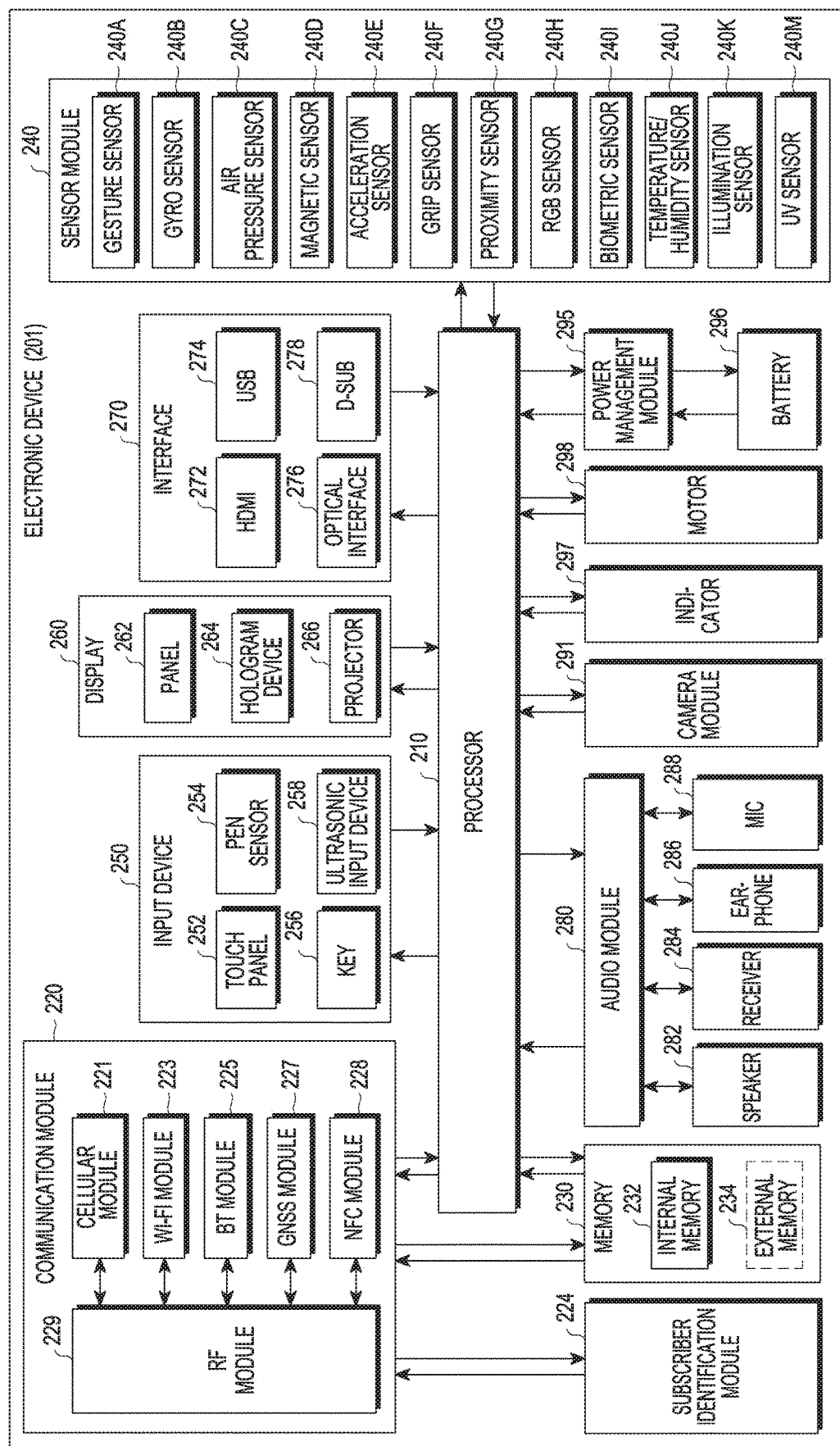
FIG. 2 is a block diagram illustrating an electronic device according to an embodiment of the present invention.

FIG. 2 is a block diagram illustrating an electronic device 201 according to various embodiments. The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present invention, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface (e.g., the communication interface 170) of FIG. 1. The communication module 220 may include, e.g., a cellular module 221, a wireless fidelity (Wi-Fi) module 223, a bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment, the cellular module 221 may perform at least some of the functions providable by the processor 210. according to an embodiment, the cellular module 221 may include a communication processor (CP). According to an embodiment of the present invention, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to another embodiment of the present invention, at least one of the cellular module 221, the Wi-Fi module 223, the bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (IC-CID) or subscriber information (e.g., an international mobile subscriber identity (IMSI)).

The memory 230 (e.g., the memory 130) may include, e.g., an internal memory 232 or an external memory 234. For example, the internal memory 232 may include at least one of a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present invention, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present invention, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may converting, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present invention, one or more image sensors (e.g., front and back sensors), a lens, an image signal processor (ISP), or a flash such as an LED or xenon lamp. The power manager module 295 may manage power of the electronic device 201, for example. According to an embodiment of the present invention, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
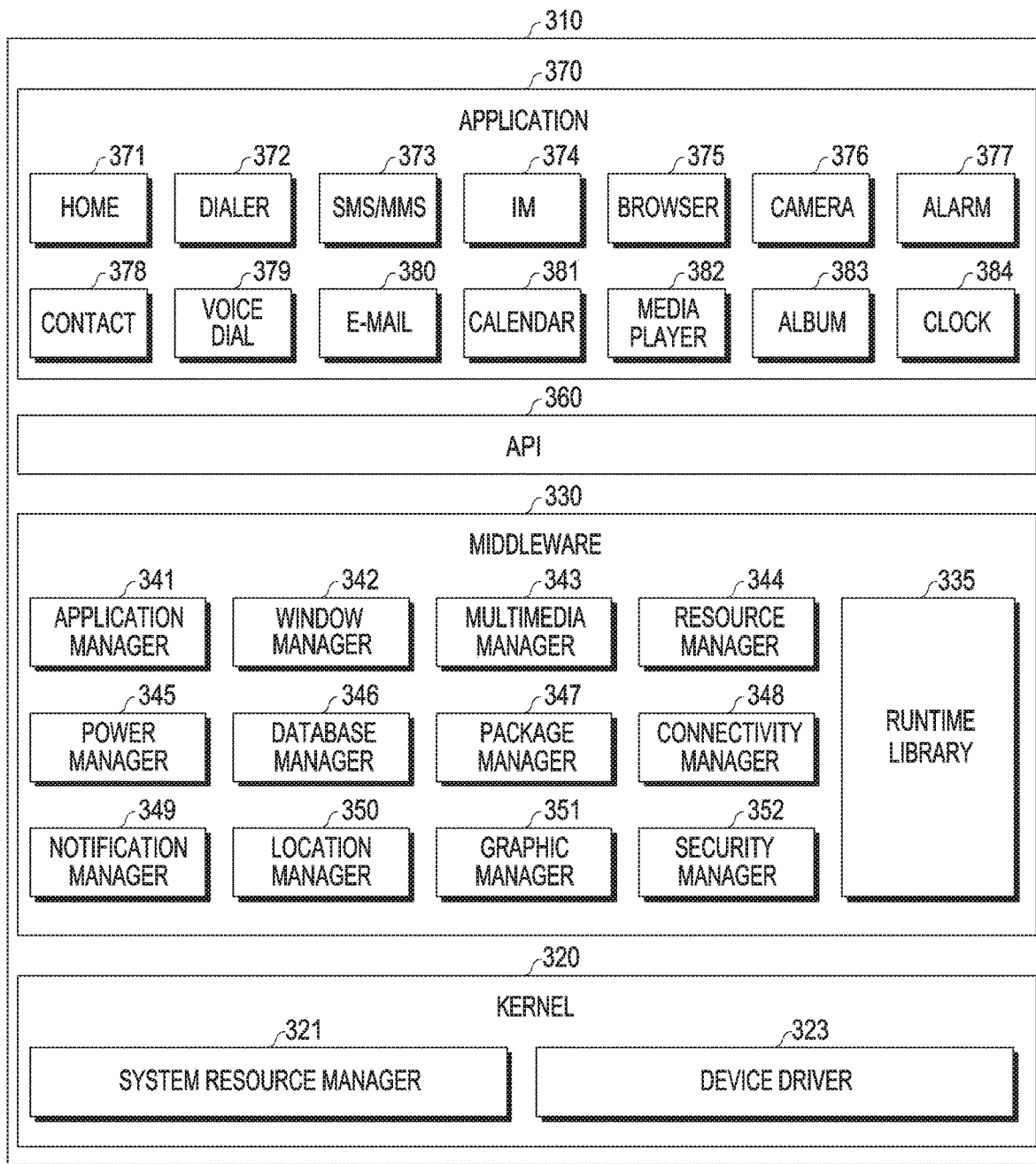
FIG. 3 is a block diagram illustrating a program module according to various embodiments.

FIG. 3 is a block diagram illustrating a program module according to various embodiments. According to an embodiment of the present invention, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment of the present invention, the system resource manager 321 may include a process managing unit, a memory managing unit, or a file system managing unit. The device driver 323 may include, e.g., a display driver, a camera driver, a bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment of the present invention, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341, for example, may manage the life cycle of the application 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present invention, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present invention, the middleware 330 may include a telephony manager for managing the voice or video call function of the electronic device or a middleware module able to form a combination of the functions of the above-described elements. According to an embodiment of the present invention, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, a heath-care (e.g., measuring the degree of workout or blood sugar), or provision of environmental information (e.g., provision of air pressure, moisture, or temperature information). According to an embodiment of the present invention, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present invention, the application 370 may include an application (e.g., a healthcare application of a mobile medical device) specified according to an attribute of the external electronic device. According to an embodiment of the present invention, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations. According to an embodiment of the present invention, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter. Modules or programming modules in accordance with various embodiments of the present invention may include at least one or more of the aforementioned components, omit some of them, or further include other additional components. Operations performed by modules, programming modules or other components in accordance with various embodiments of the present invention may be carried out sequentially, in parallel, repeatedly or heuristically, or at least some operations may be executed in a different order or omitted or other operations may be added.

Figure 4:
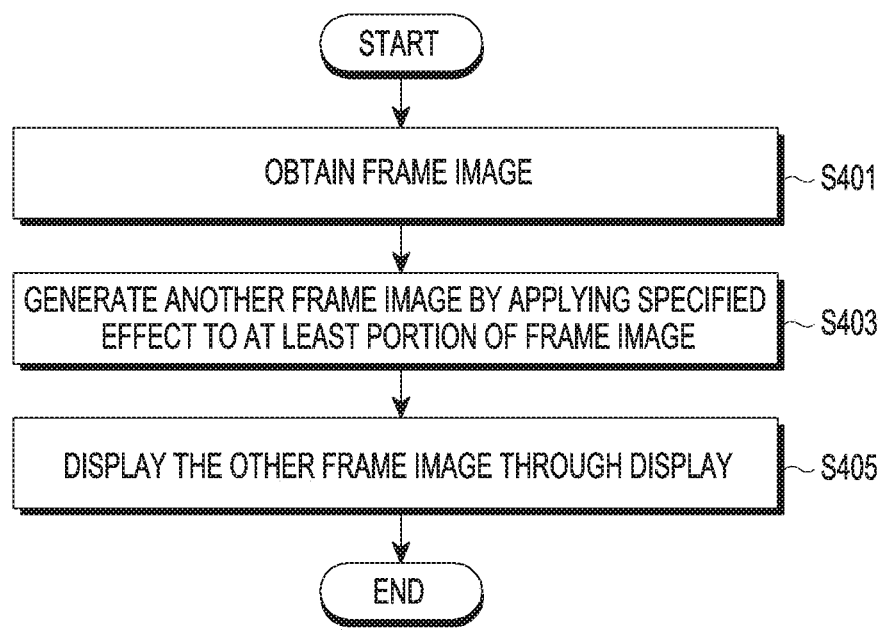
FIG. 4 illustrates a method for controlling an electronic device according to various embodiments of the present invention.

FIG. 4 illustrates a method for controlling an electronic device according to various embodiments of the present invention.

Referring to FIG. 4, according to various embodiments, in operation S401, a processor (e.g., the processor 120) may obtain a frame image, and a display driver IC (DDI), in order to drive a display (e.g., the display 160) including a memory and/or an image processing module, may obtain the frame image obtained by the processor 120 from the processor 120.

According to various embodiments, the processor may be the processor (e.g., the processor 120) of FIG. 1. The processor may be one of a sensor hub, a low-power processor, a modem processor, or a communication processor, or the processor may be part of the processor 120 of FIG. 1 in order to control at least one sensor.

According to various embodiments, in operation 5403, the display driver IC may obtain at least partial control information of control information related to the frame image from the processor 120 and apply a specified effect to at least a portion of the obtained frame image based on the at least partial control information obtained from the processor 120, thereby generating another frame image.

For example, the control information may be transmitted from the processor 120 to the display driver IC where the application currently running is an application that requires security or where a security request for an application is entered by the user.

For example, the display driver IC may generate the other frame image by applying the specified effect to the left and right portion, and/or upper and lower portion of the frame image while the specified effect is not applied to a central portion of the frame image.

For example, the specified effect may include a gradation effect or an effect for applying a specified color or pattern to at least a portion of the frame image.

For example, the display driver IC may vary the type, strength, magnitude, or pattern of the specified effect when the pressure of a touch, such as the user's input, meets a specified value.

For example, when the transformable display is bent, folded, or transformed, the display driver IC may vary the kind, strength, magnitude, or pattern of the specified effect. For example, when the angle of the display varies, the display driver IC may change the kind, strength, magnitude, or pattern of the specified effect.

For example, when a particular user is authenticated via fingerprint or iris sensing, the display driver IC may vary the type, strength, magnitude, or pattern of the specified effect.

For example, the display driver IC may vary or delete the specified effect according to a preset condition.

For example, the display driver IC may generate the other frame image by applying a gradation effect to the left and right portion of the frame image while the gradation effect is not applied to the central portion of the frame image.

For example, the display driver IC may apply the specified effect to at least a portion of the frame image using a Gaussian function.

For example, the display driver IC may apply the specified effect to at least a portion of the frame image using a unit step function, sine function, cosine function, square wave function, rectangular wave function, or sawtooth wave function, as well as the Gaussian function.

According to various embodiments, the display driver IC may determine whether the user input meets a specified condition, and when the user input meets the specified condition, may apply the specified effect to at least a portion of the frame image.

According to various embodiments, the display driver IC may be configured to apply the specified effect to the frame image when a first specified application runs through the electronic device (e.g., the electronic device 101) while not applying the specified effect to the frame image when a second specified application runs.

For example, the display driver IC may determine whether the first specified application runs and may apply the specified effect to the first specified application. The display driver IC may obtain information indicating that the first specified application has been run by the processor 120 and may apply the specified effect to the frame image.

For example, the first specified application may include a photo application, video application, financial application, memo application, SNS application, messenger application, SMS application, or email application that requires the protection of personal information.

According to various embodiments, the display driver IC may be configured not to apply the specified effect to the frame image when second content is included in the frame image while applying the specified effect to the frame image when first content is included in the frame image through the electronic device 101.

For example, the first content may include a preset person image or a preset message. For example, the first content may include an image that includes, in the meta data, information indicating that the specified effect should be applied to a particular portion, such as an image containing personal information (e.g., an ID image) or an image of a person wearing revealing clothes (e.g., an image of a person wearing a swimsuit).

According to various embodiments, when it is one of a sensor hub, a low-power processor, a modem processor, or a communication processor among other processors of the electronic device 101, and other people around the electronic device (e.g., the electronic device 101) are identified by one of the sensor hub, low-power processor, modem processor, or communication processor, the display driver IC may obtain control information in order to enable applying the specified effect to the frame image from one processor of the sensor hub, low-power processor, modem processor, or communication processor, and based thereupon, the display driver IC may apply the specified effect to the frame image.

According to various embodiments, in operation S405, the display driver IC may display the other frame image through the display 160 based on at least partial control information obtained from the processor 120.

Figure 5A:
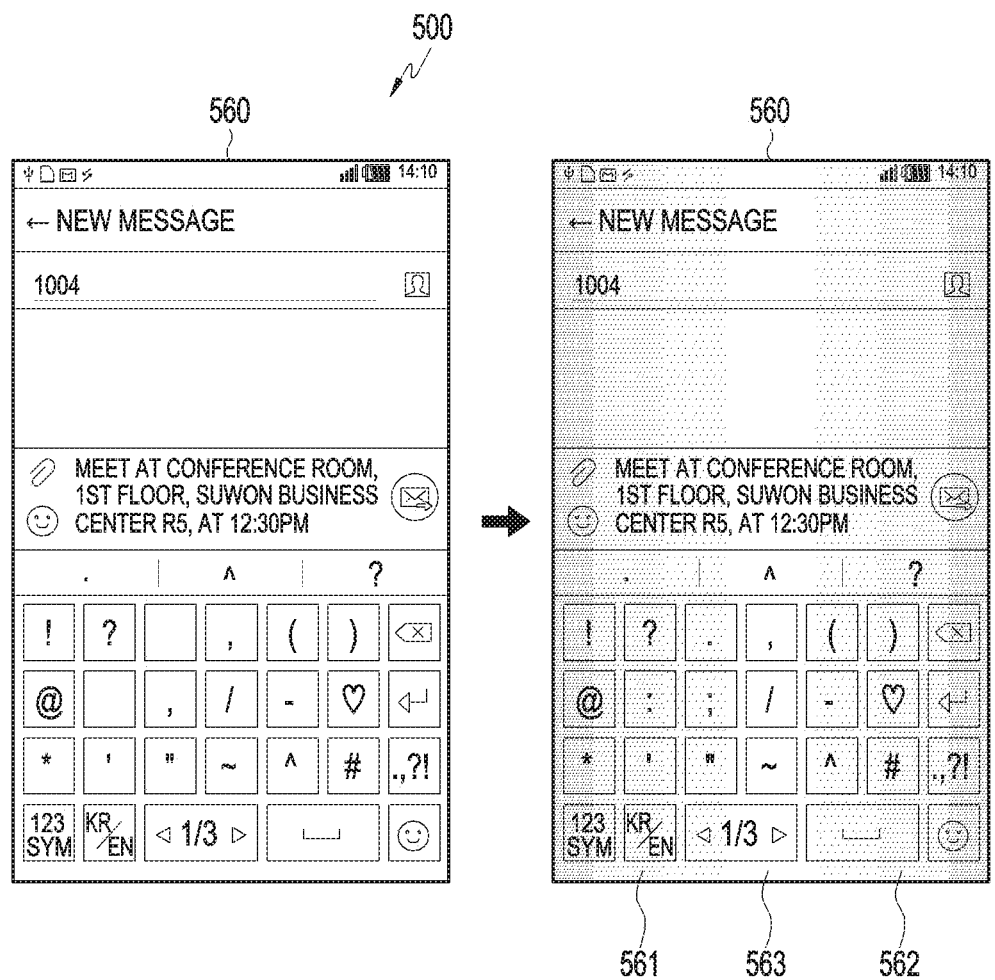
FIGS. 5a to 5c illustrate a method for applying a specified effect according to various embodiments of the present invention.
Figure 5B:
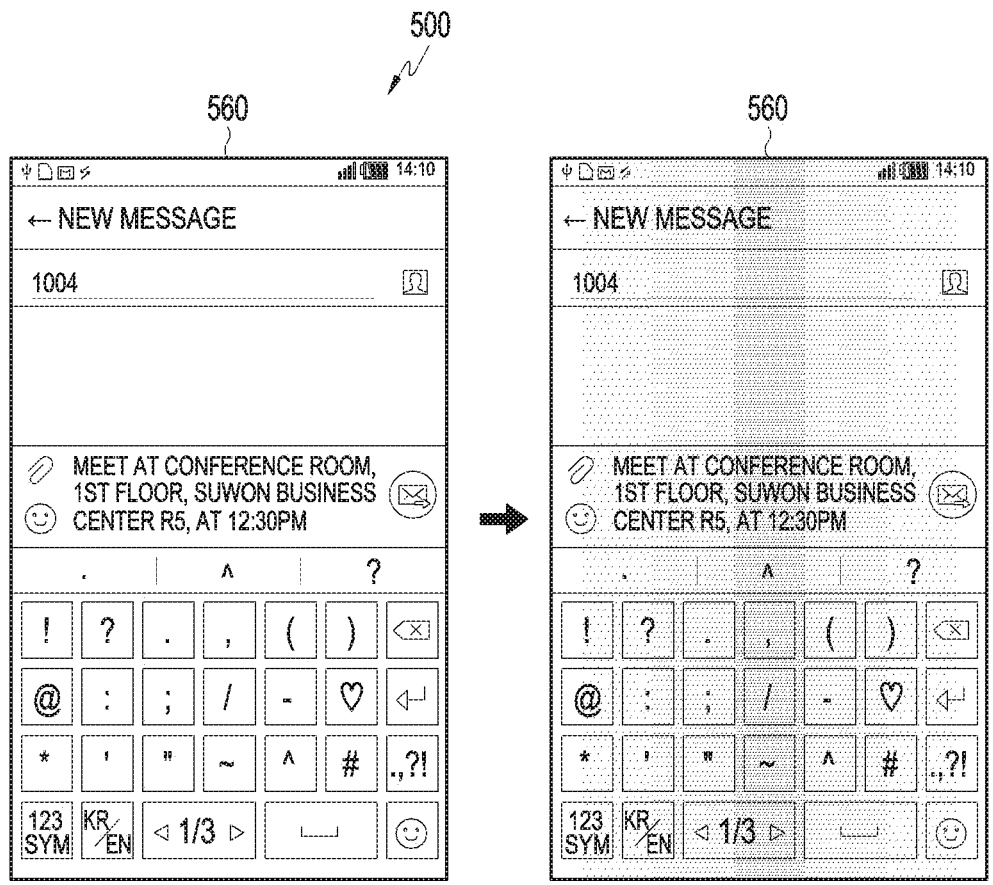
Figure 5C:
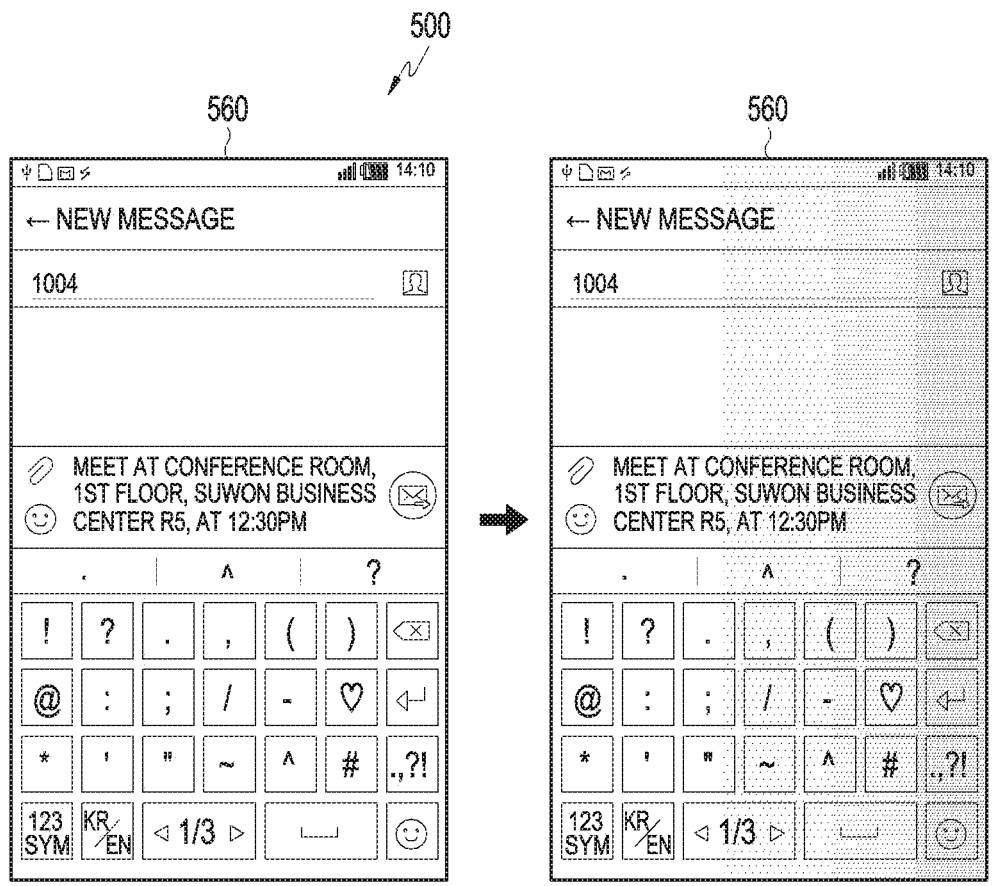

FIGS. 5a to 5c illustrate a method for applying a specified effect according to various embodiments of the present invention.

Referring to FIG. 5a, according to various embodiments, a processor (e.g., the processor 120) of an electronic device 500 may obtain a frame image.

According to various embodiments, the display driver IC may obtain the frame image from the processor 120.

According to various embodiments, the display driver IC may apply a gradation effect to the obtained frame image, thereby generating another frame image. For example, the display driver IC may generate the other frame image by applying the specified effect to the left portion 561 and the right portion 562 while not applying the specified effect to the central portion 563 of the obtained frame image.

According to various embodiments, the display driver IC may display the other frame image generated through the display 560.

Referring to FIG. 5b, according to various embodiments, the display driver IC may apply the specified effect to the central portion of the obtained frame image but might not apply the gradation effect to the left and right portion.

Referring to FIG. 5c, according to various embodiments, the display driver IC may apply the gradation effect only to the right portion of the obtained frame image.

Figure 6A:
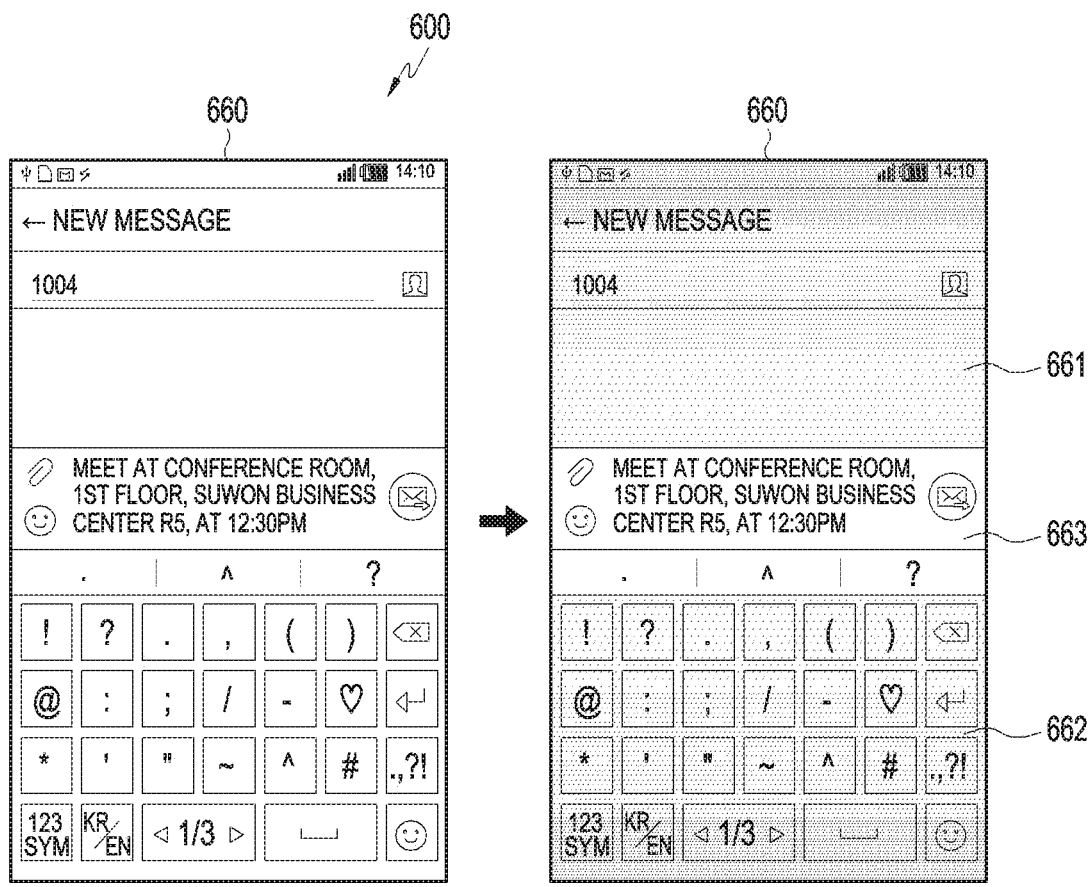
FIGS. 6a to 6c illustrate a method for applying a specified effect according to various embodiments of the present invention.
Figure 6B:
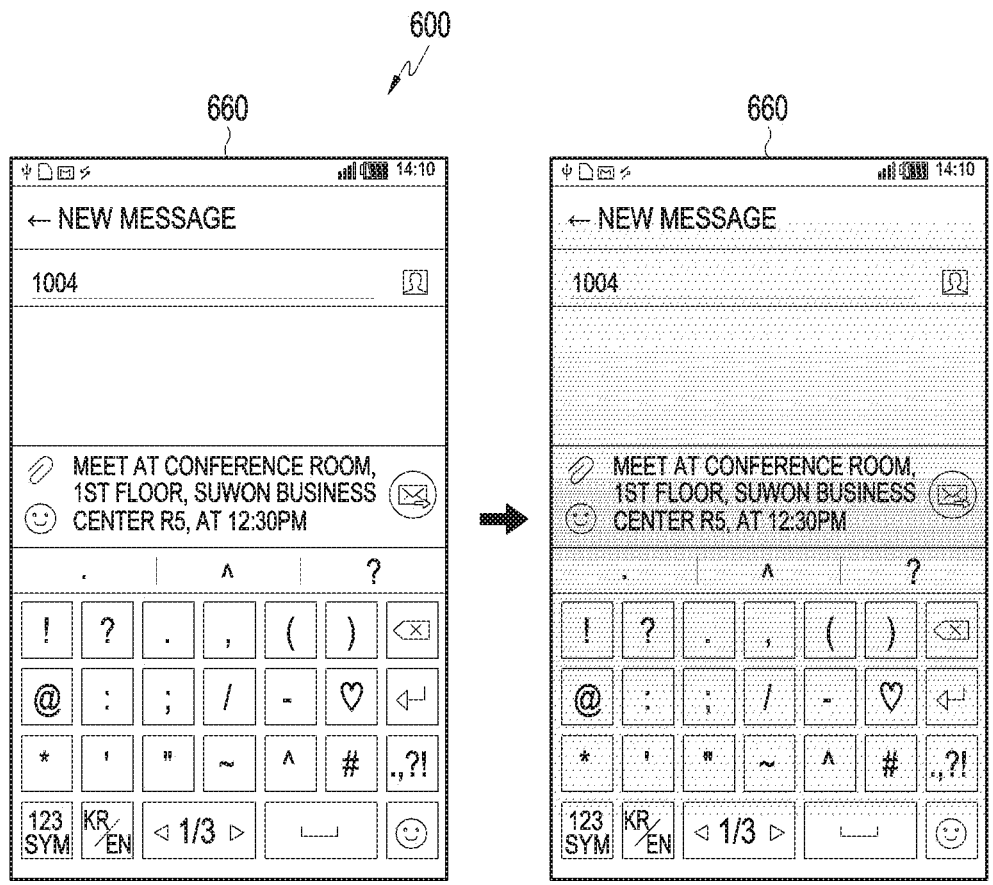
Figure 6C:
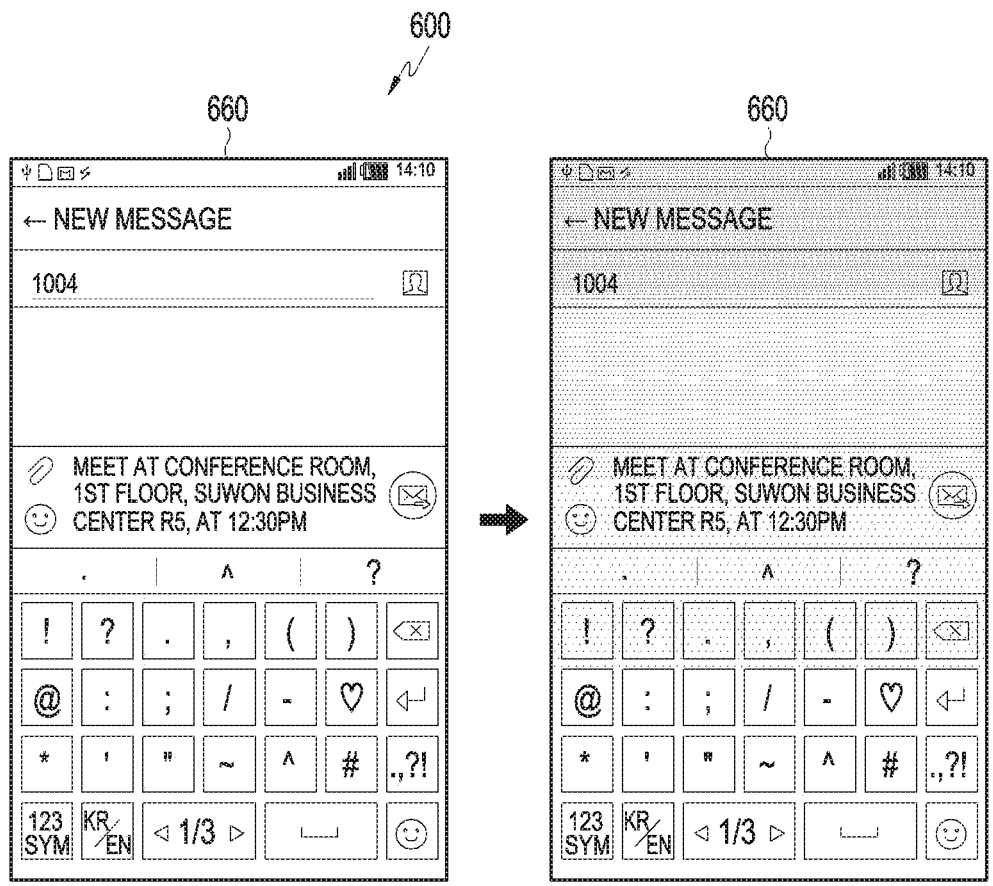

FIGS. 6a to 6c illustrate a method for applying a specified effect according to various embodiments of the present invention.

Referring to FIG. 6a, according to various embodiments, a processor (e.g., the processor 120) of an electronic device 600 may obtain a frame image.

According to various embodiments, the display driver IC may obtain the frame image from the processor 120.

According to various embodiments, the display driver IC may apply a gradation effect to the obtained frame image, thereby generating another frame image. For example, the display driver IC may generate the other frame image by applying the specified effect to an upper portion 661 and a lower portion 662 while not applying the specified effect to a central portion 663 of the obtained frame image.

According to various embodiments, the display driver IC may display the other frame image generated through the display 660.

Referring to FIG. 6b, according to various embodiments, the display driver IC may apply the specified effect to the central portion of the obtained frame image but might not apply the gradation effect to the upper and lower portion.

Referring to FIG. 6c, according to various embodiments, the display driver IC may apply the specified effect only to the upper portion of the obtained frame image but might not apply the gradation effect to the central and lower portion.

Figure 7:
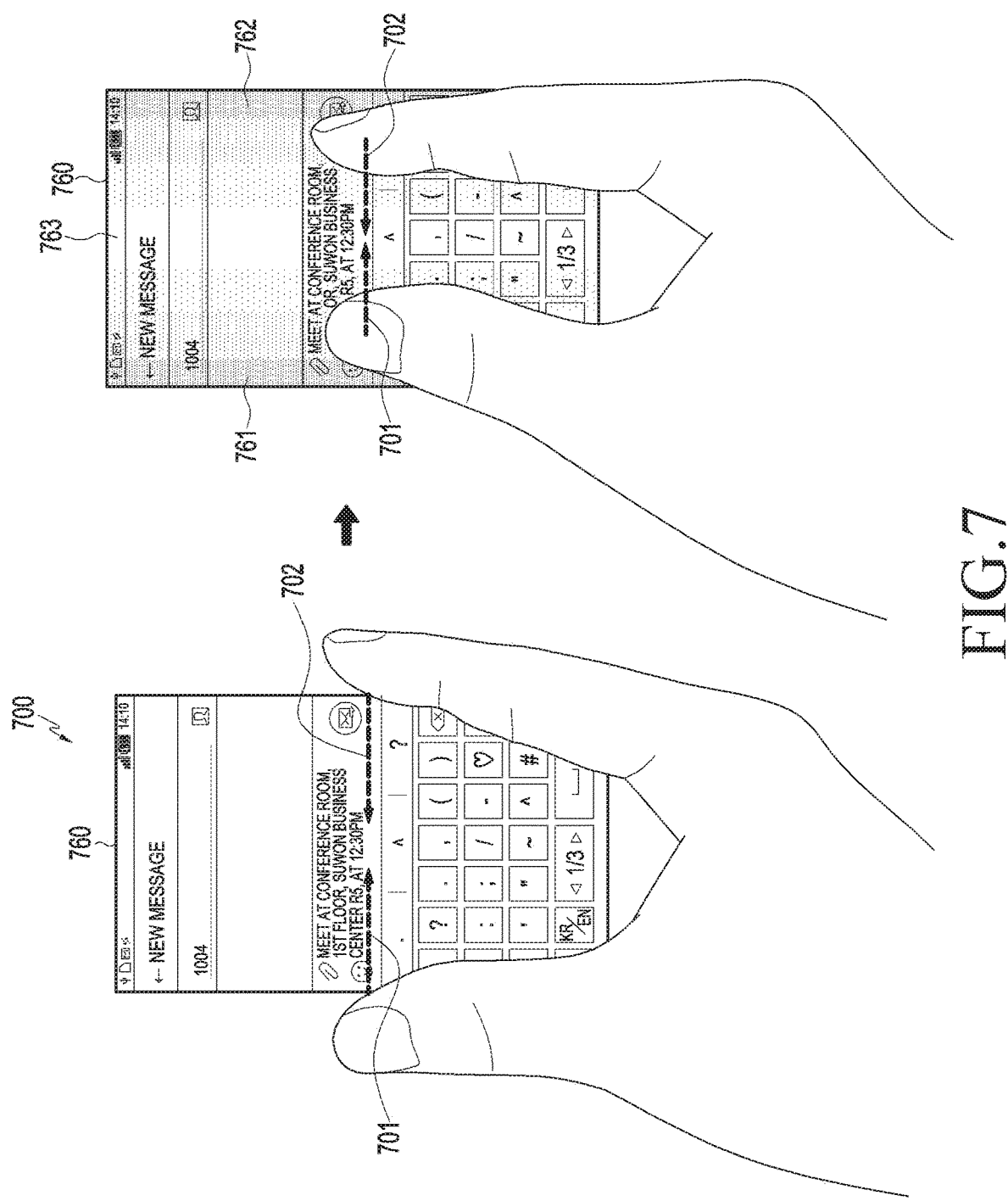
FIG. 7 illustrates a method for applying a specified effect according to various embodiments of the present invention.

FIG. 7 illustrates a method for applying a specified effect according to various embodiments of the present invention.

Referring to FIG. 7, according to various embodiments, upon receiving a user's pinch-in input in a first central direction 701, which is directed from the left edge of the display 760 to the center of the display 760, and in a second central direction 702, which is directed from the right edge to the center of the display 760, while the frame image is displayed on the display 760 of the electronic device 700, the display driver IC may generate another frame image by applying a gradation effect to the frame image in response to the pinch-in input in the first and second central directions 701 and 702.

For example, the display driver IC may generate the other frame image by applying the specified effect to the left portion 761 and the right portion 762 while not applying the specified effect to the central portion 763 of the frame image.

According to various embodiments, the display driver IC may display the other frame image generated through the display 760.

Figure 8:
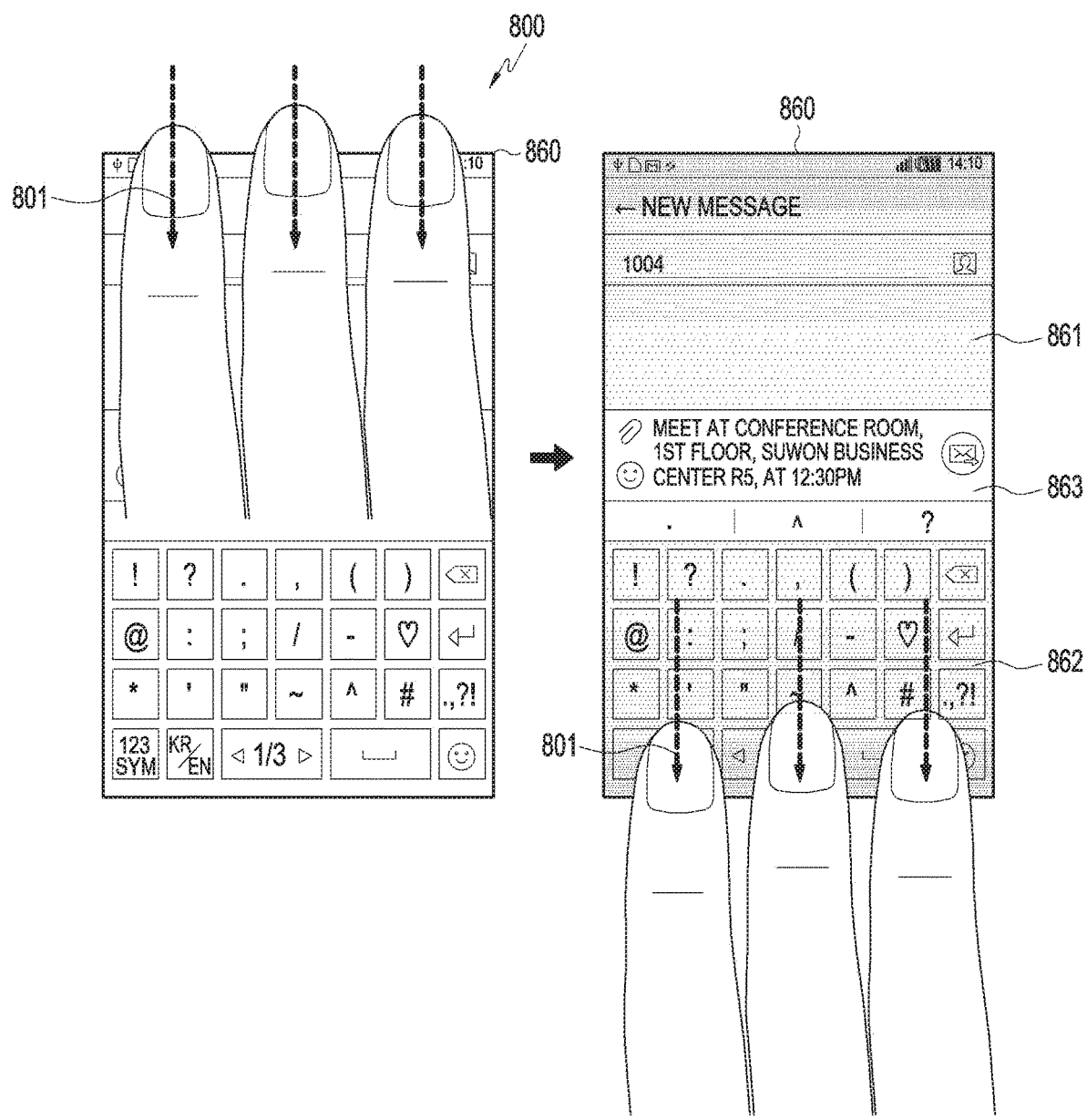
FIG. 8 illustrates a method for applying a specified effect according to various embodiments of the present invention.

FIG. 8 illustrates a method for applying a specified effect according to various embodiments of the present invention.

Referring to FIG. 8, according to various embodiments, upon receiving a user's flicking input in a third central direction 801, which is directed from the upper edge of the display 860 to the center of the display 860, while the frame image is displayed on the display 860 of the electronic device 800, the display driver IC may generate another frame image by applying a gradation effect to the frame image in response to the user's flicking input in the third central direction 801.

For example, the display driver IC may generate the other frame image by applying the specified effect to the upper portion 861 and the lower portion 862 while not applying the specified effect to the central portion 863 of the frame image.

According to various embodiments, the display driver IC may display the other frame image generated through the display 860.

Figure 9A:
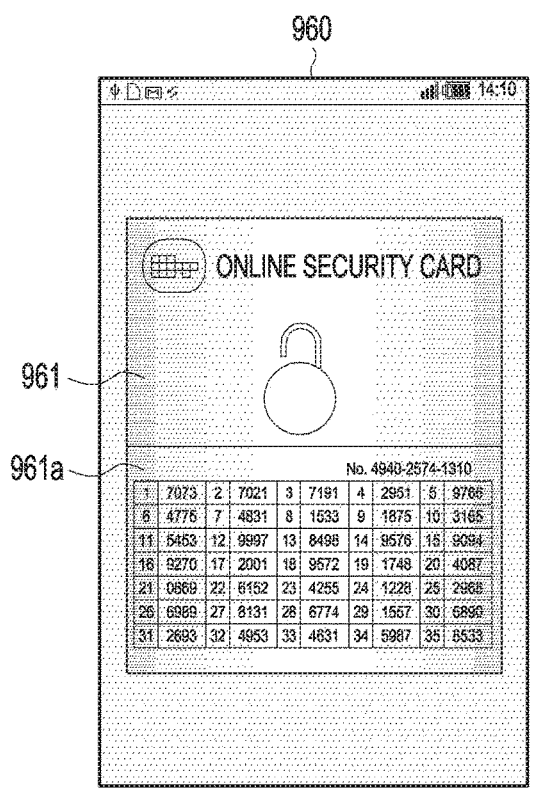
FIGS. 9a, 9b, 10, and 11a to 11c illustrate examples of a first application according to various embodiments of the present invention.
Figure 9B:
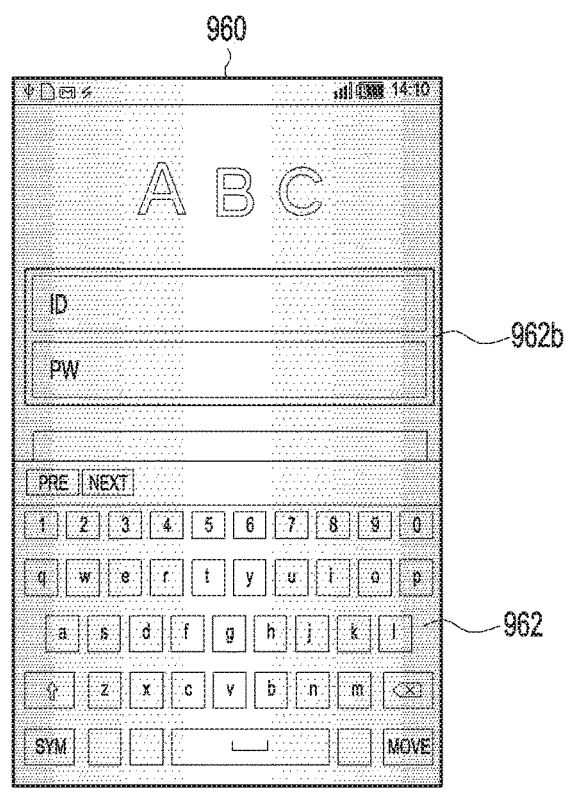
Figure 10:
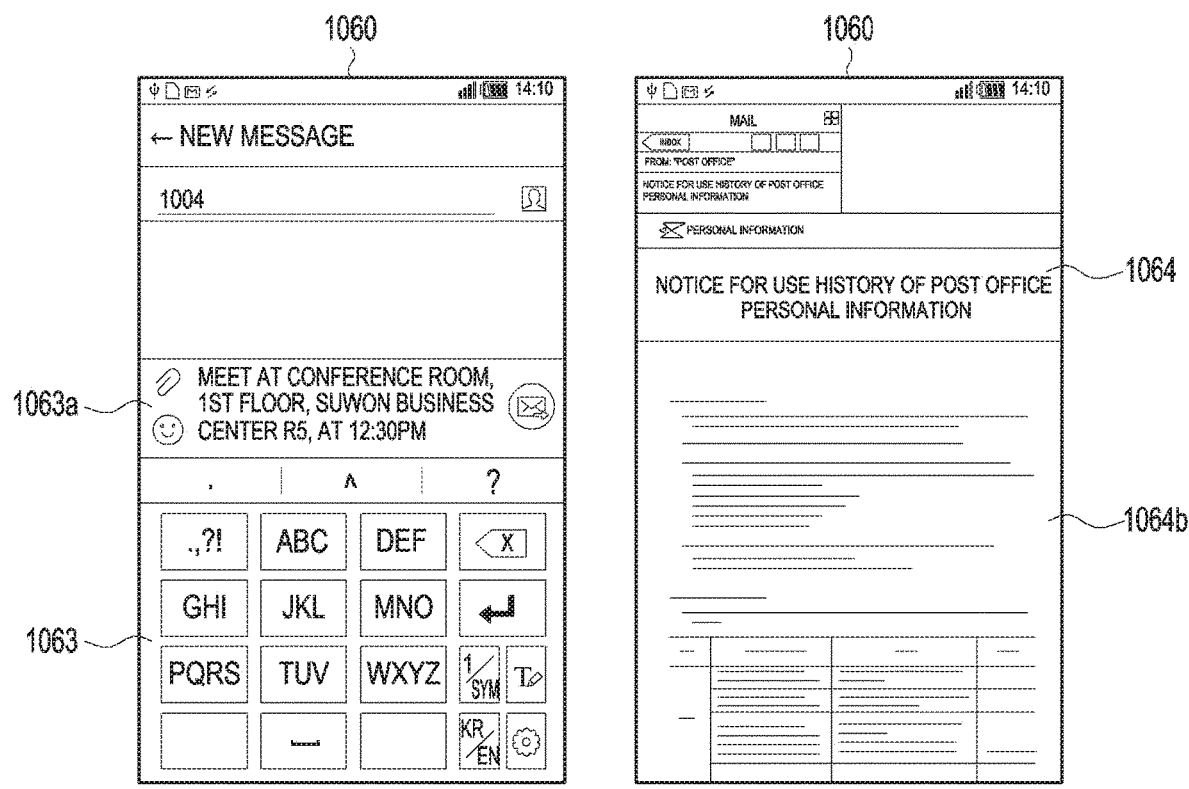
Figure 11:
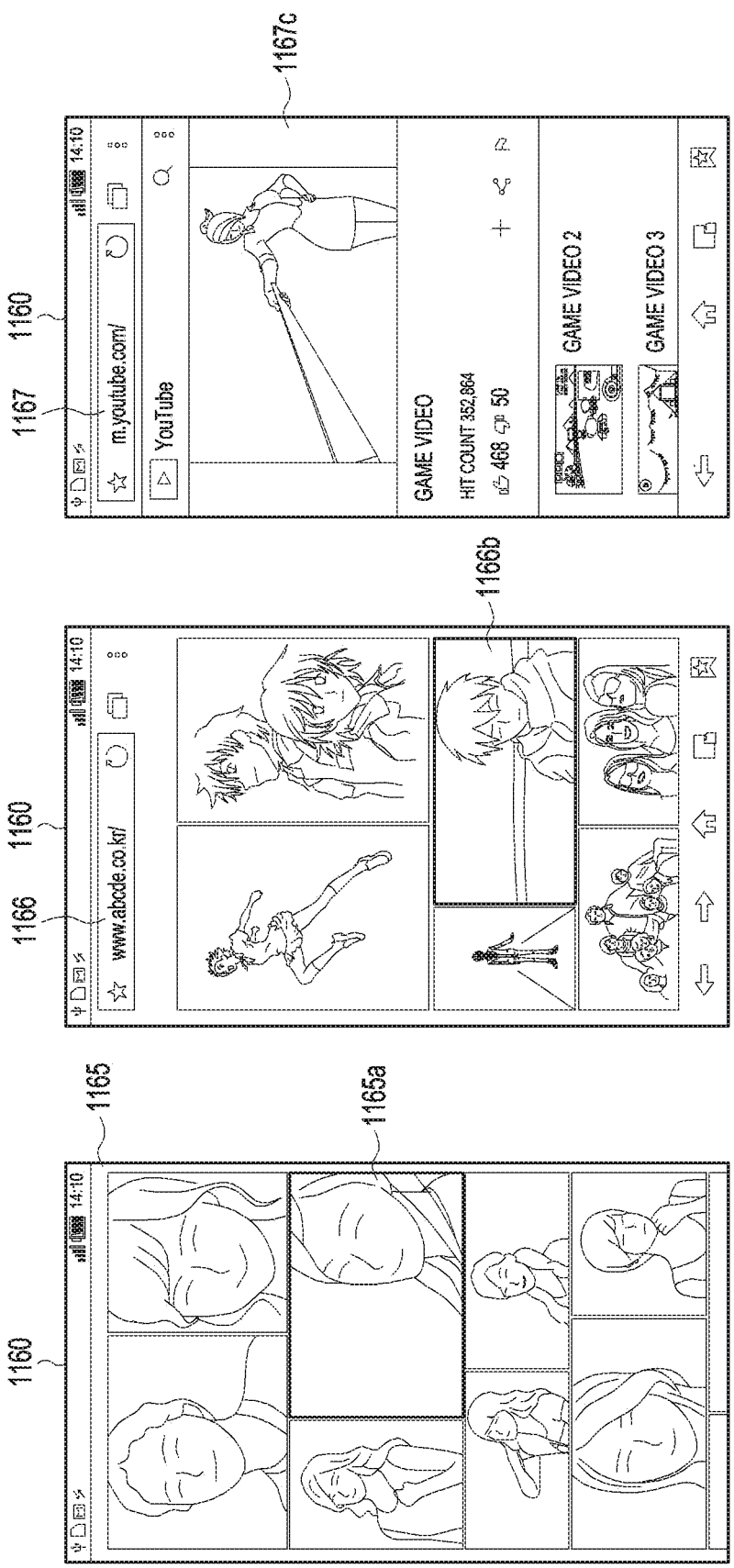

FIGS. 9 to 11 illustrate examples of a first application according to various embodiments of the present invention.

Referring to FIG. 9, a first application may be, e.g., a financial application 961 that contains a security serial number 961a displayed on the display 960 or an Internet application 962 that contains a login window 962b displayed on the display 960.

Referring to FIG. 10, the first application may be, e.g., a message transmission application 1063 containing a message 1063a displayed on the display 1060 or an email application 1064 containing an email 1064b displayed on the display 1060.

Referring to FIG. 11, the first application may be, e.g., a photo application 1165 containing a particular FIG. 1165a displayed on the display 1160, an Internet application 1166 containing a particular subject 1165b, or an SNS application 1167 containing a particular object 1167c.

Figure 12:
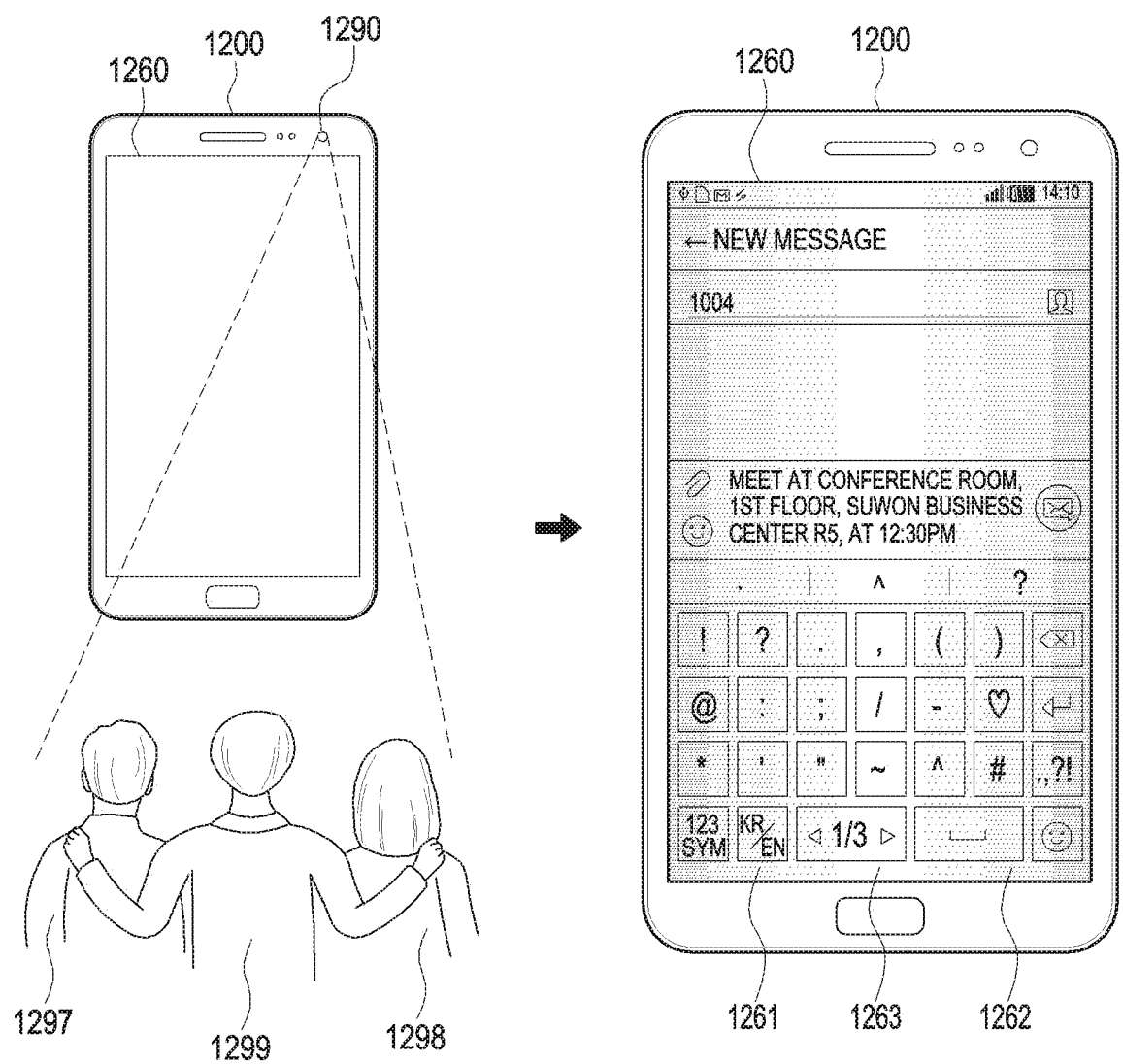
FIG. 12 illustrates an example of applying a specified effect depending on an ambient environment of an electronic device according to various embodiments of the present invention.

FIG. 12 illustrates an example of applying a specified effect depending on the ambient environment of an electronic device according to various embodiments of the present invention.

Referring to FIG. 12, for example, a camera module 1290 of an electronic device 1200 may detect people 1297 and 1298 other than the user 1299, who is in front of the front surface of the electronic device 1200.

For example, when the people 1297 and 1298 other than the user 1299 in front of the front surface of the electronic device 1200 are detected, the display driver IC may apply a gradation effect to the left portion 1261 and the right portion 1262, which are at least a portion of the frame image displayed through the display 1260, to thereby generate another frame image, and may then display the other frame image on the display 1260.

FIGS. 13a to 13d illustrate a method for applying a specified effect according to various embodiments of the present invention.

Figure 13A:
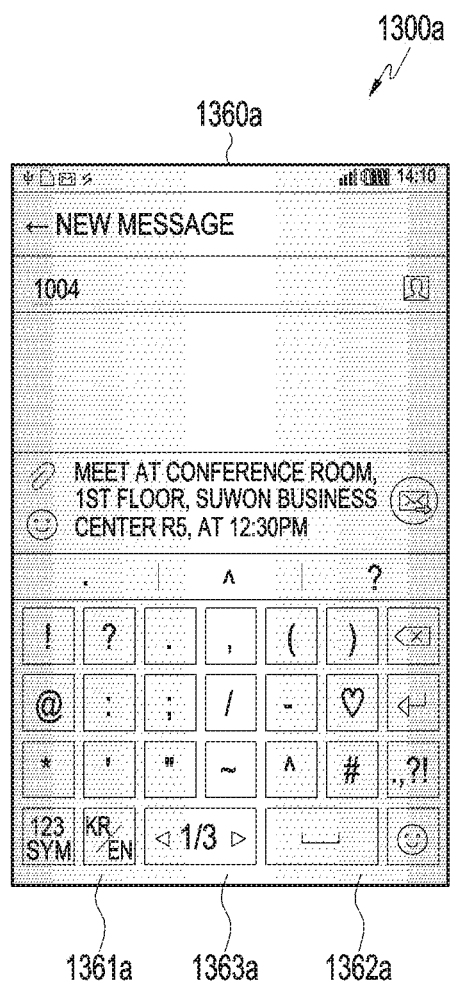
FIGS. 13a to 13d illustrate a method for applying a specified effect according to various embodiments of the present invention.

Referring to FIG. 13a, for example, the display driver IC may apply a gradation effect to the left portion 1361a from the left edge to the central portion of the region of the frame image 1360a obtained from a processor (e.g., the processor 120) and the right portion 1362a from the right edge to the central portion, using a Gaussian function.

Figure 13B:
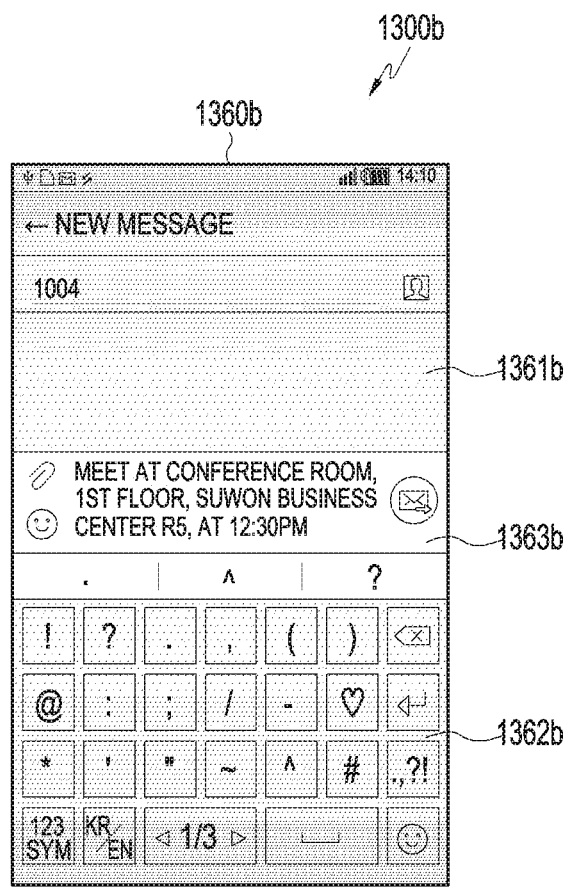

Referring to FIG. 13b, for example, the display driver IC may apply a gradation effect to the upper portion 1361a from the upper edge to the central portion of the region of a frame image 1360*b* obtained from the processor 120 and the lower portion 1362*b* from the lower edge to the central portion, using a Gaussian function.

Figure 13C:
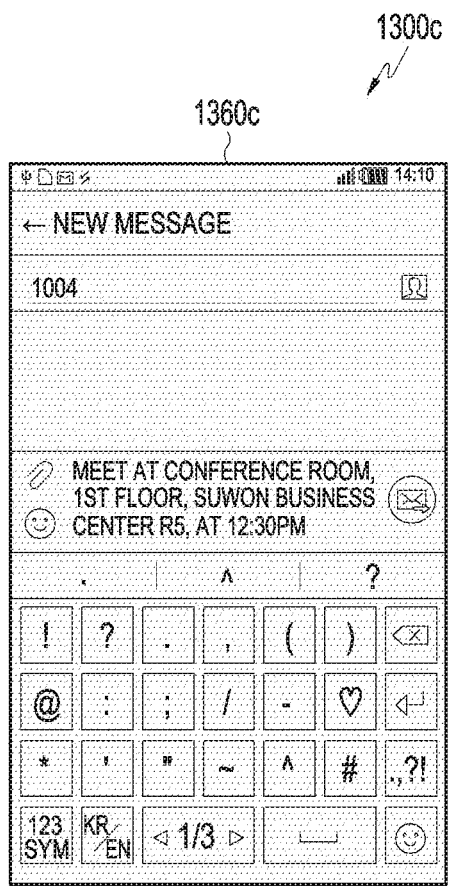

Referring to FIG. 13*c*, for example, the display driver IC may apply the gradation effect to the whole region of the obtained frame image 1360*c*.

Figure 13D:
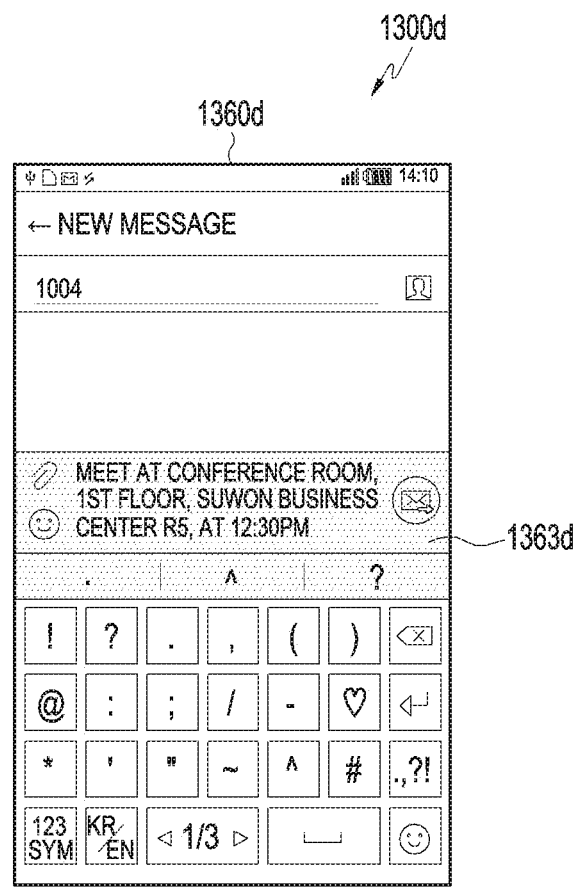

Referring to FIG. 13*d*, for example, the display driver IC may apply the gradation effect to only some portion 1363*d*, which is determined to require a privacy function, among the portions of the frame image 1360*d* obtained, but may not apply the gradation effect to the rest.

Figure 14:
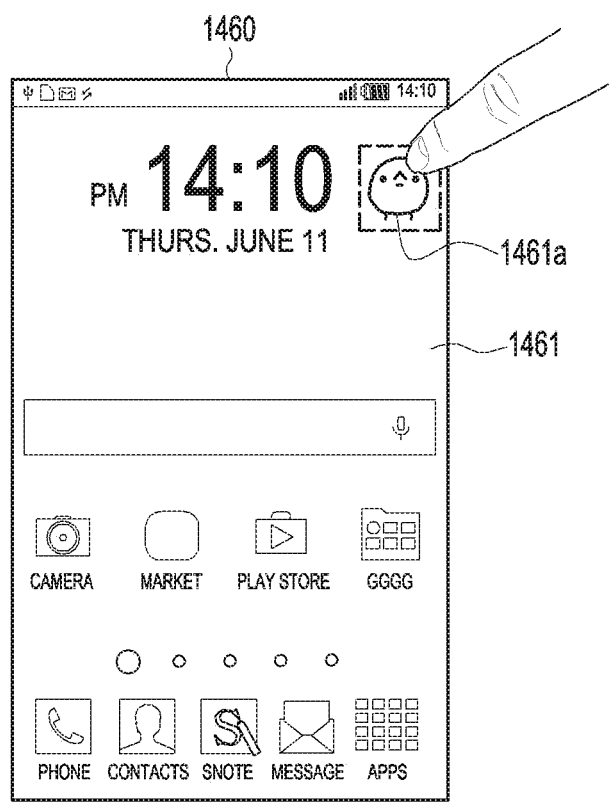
FIGS. 14 and 15 illustrate instructions to enable applying a specified effect according to various embodiments of the present invention.
Figure 15:
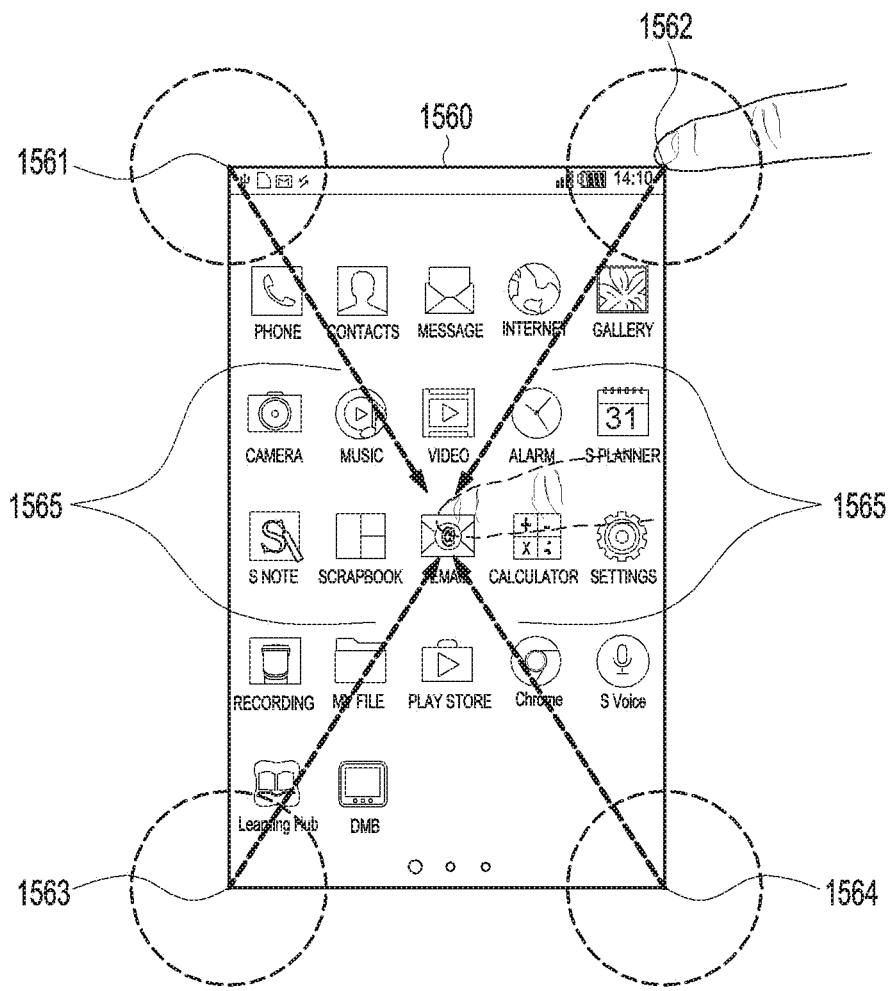

FIGS. 14 and 15 illustrate instructions to enable applying a specified effect according to various embodiments of the present invention.

Referring to FIG. 14, for example, the user may touch an effect designation icon 1461*a* displayed on a portion of the display 1461*a* while a frame image 1461 is displayed on the display 1460.

For example, when the user's touch input is received via the effect designation icon 1461*a*, the display driver IC may apply a specified effect to at least a portion of the frame image 1461, thereby generating another frame image.

Referring to FIG. 15, for example, the user may input a drag input in a central direction 1565, which is directed from the left top edge 1561, the right top edge 1562, the left bottom edge 1563, and the right bottom edge 1564 to the center while the frame image 1561 is displayed on the display 1560.

For example, when the drag in the central direction 1565 is received, the display driver IC may apply a specified effect to at least a portion of the frame image 1561, thereby generating another frame image.

Figure 16:
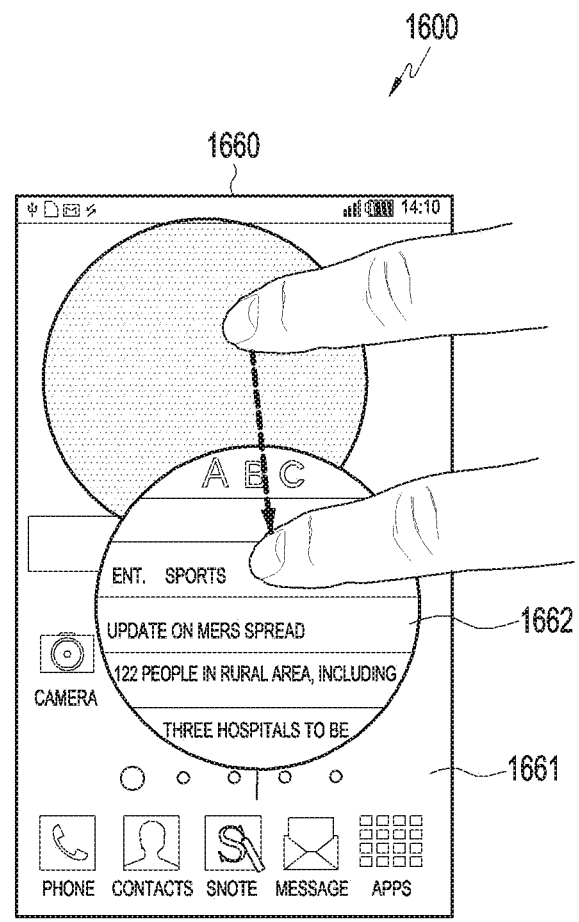
FIG. 16 illustrates an example of a specified effect according to various embodiments of the present invention.

FIG. 16 illustrates an example of a specified effect according to various embodiments of the present invention.

Referring to FIG. 16, for example, the display driver IC may apply a magnifying effect to a circular portion 1662 among portions of the frame image 1661 displayed on the display 1660 of the electronic device 1600.

For example, when the user's touch and drag input is received through the magnifying effect-applied portion 1662, the display driver IC may move the magnifying effect-applied portion 1662 in the direction of the drag.

Figure 17:
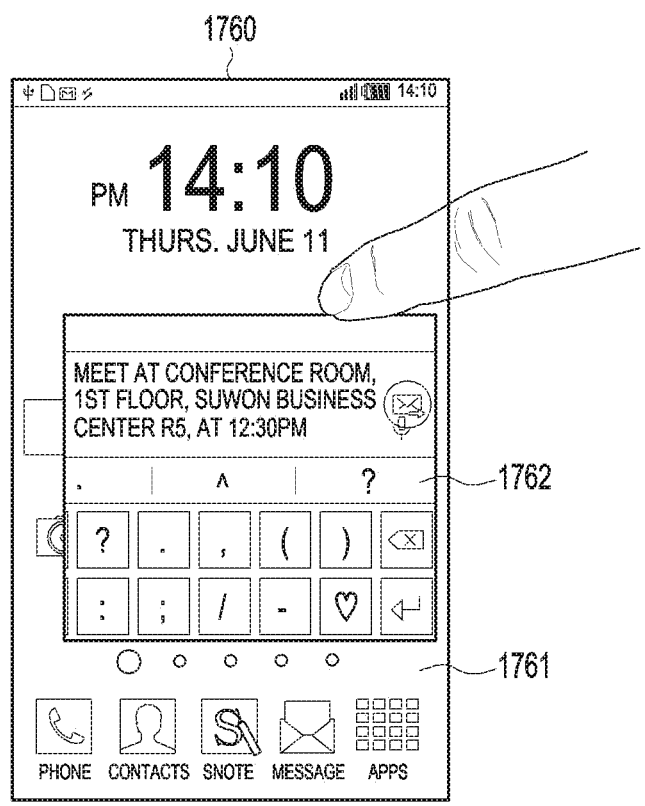
FIG. 17 illustrates another example of a specified effect according to various embodiments of the present invention.

FIG. 17 illustrates another example of a specified effect according to various embodiments of the present invention.

Referring to FIG. 17, for example, the display driver IC may apply a magnifying effect to a rectangular portion 1762 among portions of the frame image 1761 displayed on the display 1760 of the electronic device 1700.

For example, when the user's touch and drag input is received through the magnifying effect-applied portion 1762, the display driver IC may move the magnifying effect-applied portion 1762 in the direction of the drag.

Figure 18A:
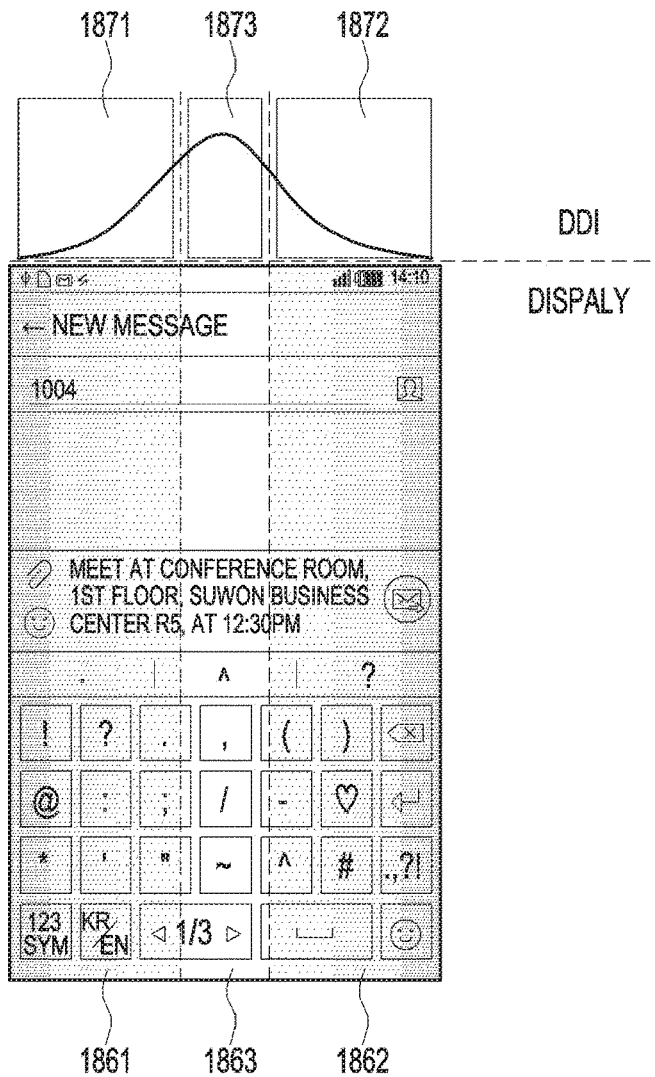
FIGS. 18(a) and 18(b) illustrate a method for applying a specified effect according to various embodiments of the present invention.
Figure 18B:
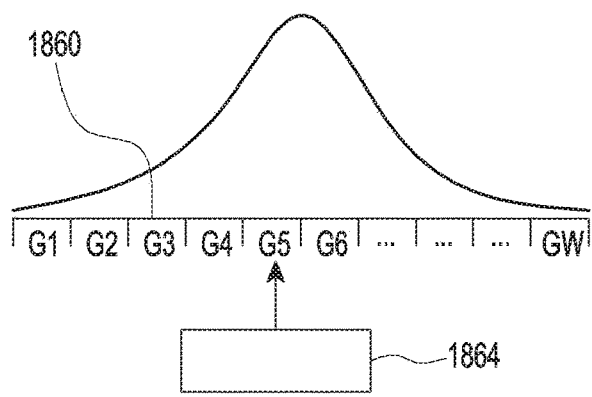

FIGS. 18(*a*) and 18(*b*) illustrate a method for applying a specified effect according to various embodiments of the present invention.

Referring to FIG. 18(*a*), for example, the display driver IC may display an execution screen of a message application through the display.

For example, the display driver IC may apply a gradation effect to the left portion 1861 and/or the right portion 1862 of the display region but not apply the gradation effect to the central portion 1863.

For example, the display driver IC may perform control to enable the left region 1871 of a Gaussian function to be shown using a first driver IC, of the display driver IC, corresponding to the left region 1861 of the display using the Gaussian function, to enable the right region 1872 of the Gaussian function to be shown using a second driver IC, of the display driver IC, corresponding to the right region 1862 of the display, and to enable the central region 1873 of the Gaussian function to be shown using a third driver IC, of the display driver IC, corresponding to the central region 1863 of the display.

Referring to FIG. 18(*b*), for example, the display driver IC 1864 may apply a gradation effect to at least a portion of the frame image displayed on the display 1860 using at least one source driver transistor denoted with G1 to GW.

Figure 19A:
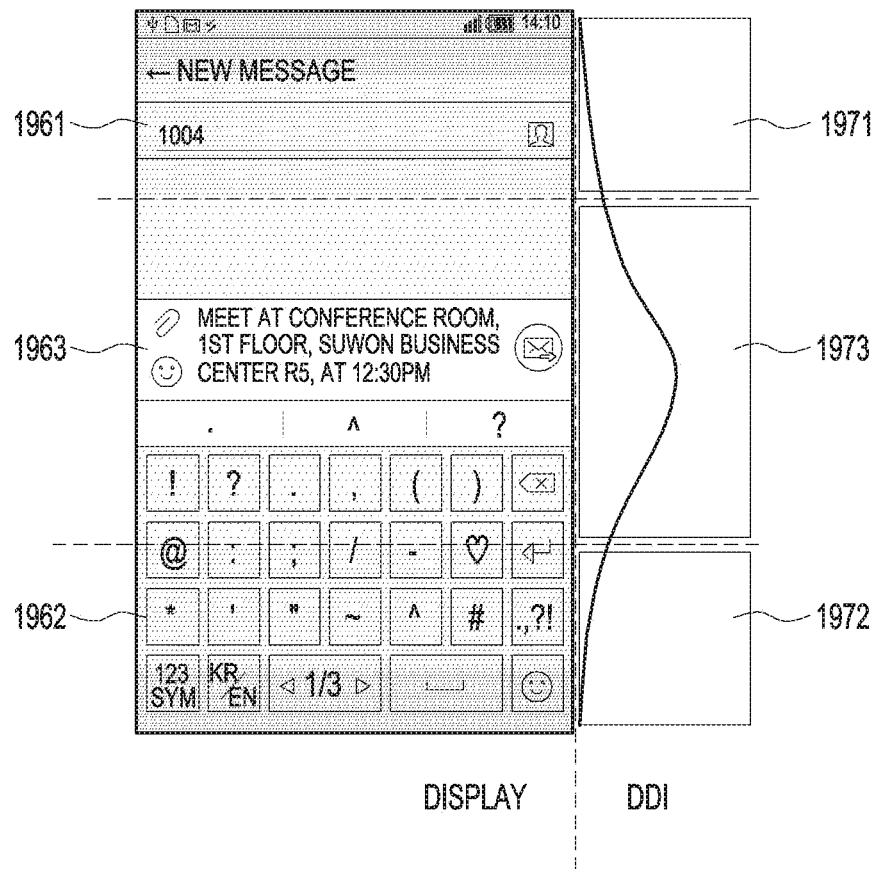
FIGS. 19(a) and 19(b) illustrate a method for applying a specified effect according to various embodiments of the present invention.
Figure 19B:
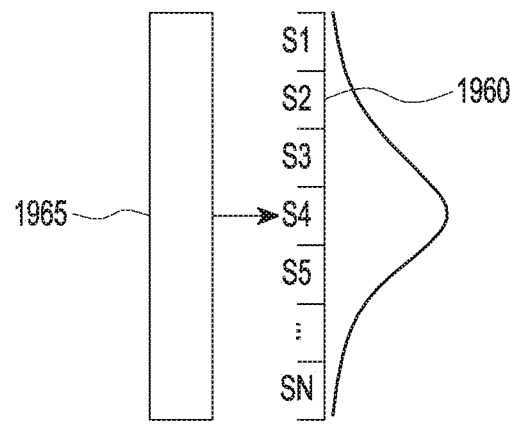

FIGS. 19(*a*) and 19(*b*) illustrate a method for applying a specified effect according to various embodiments of the present invention.

Referring to FIG. 19(*a*), for example, the display driver IC may display an execution screen of a message application through the display.

For example, the display driver IC may apply a gradation effect to the upper portion 1961 and/or the lower portion 1962 of the display region but not apply the gradation effect to a central portion 1963.

For example, the display driver IC may perform control to enable the upper region 1971 of a Gaussian function to be shown using a first driver IC, of the display driver IC, corresponding to the upper region 1961 of the display using the Gaussian function, to enable the lower region 1972 of the Gaussian function to be shown using a second driver IC, of the display driver IC, corresponding to the lower region 1962 of the display, and to enable the central region 1973 of the Gaussian function to be shown using a third driver IC, of the display driver IC, corresponding to the central region 1963 of the display.

Referring to FIG. 19(*b*), for example, the display driver IC 1965 may apply a gradation effect to at least a portion of the frame image displayed on the display 1960 using at least one source driver transistor denoted with S1 to SN.

Figure 20:
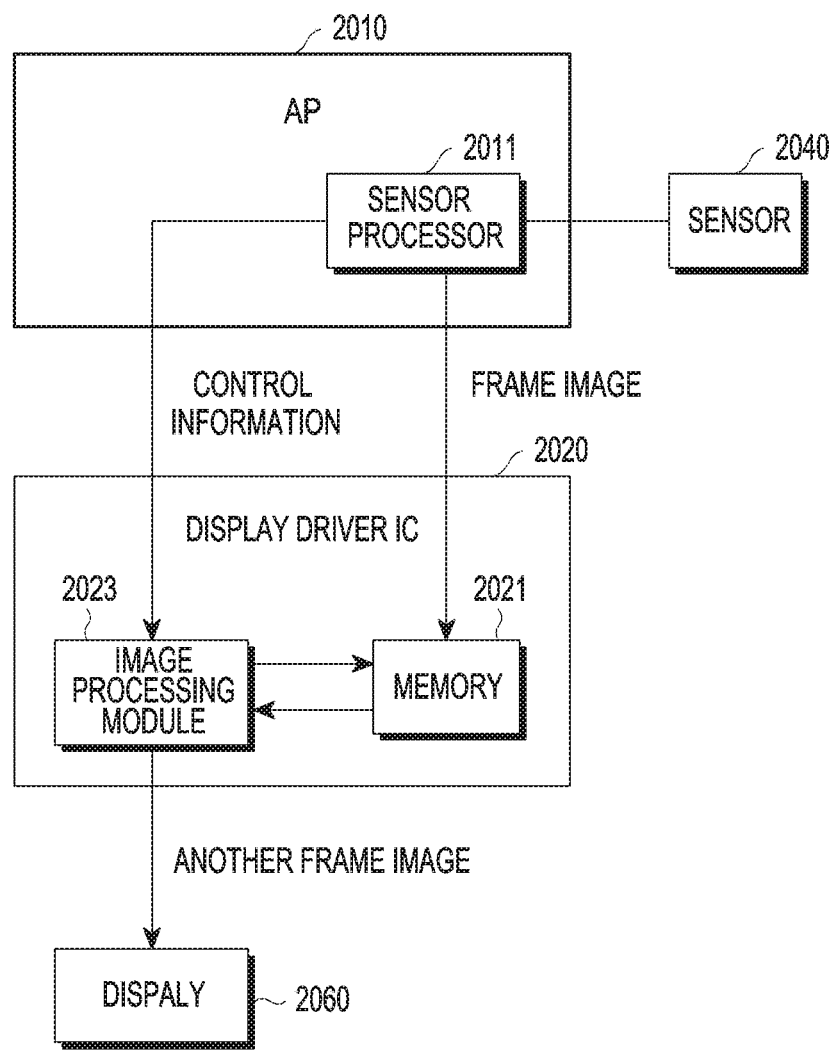
FIG. 20 illustrates components of an electronic device according to various embodiments of the present invention.

FIG. 20 illustrates components of an electronic device according to various embodiments of the present invention.

Referring to FIG. 20, according to various embodiments, an electronic device (e.g., the electronic device 101) may include an application processor (AP) 2010, a sensor 2040, a display driver IC 2020, and a display 2060.

For example, the AP 2010 may include a sensor processor 2011 to control the sensor 2040 and to obtain sensing information from the sensor 2040.

For example, the display driver IC 2020 may include an image processing module 2023 to apply a specified effect to a frame image that is to be transmitted to the display 2060 in order to thereby generate another frame image, and a memory 2021 to store the frame image and the other frame image.

For example, the image processing module 2023 may receive control information from the sensor processor 2011 or the AP 2010 and may apply a specified effect to at least a portion of the frame image stored in the memory 2021 based on the received control information.

Figure 21:
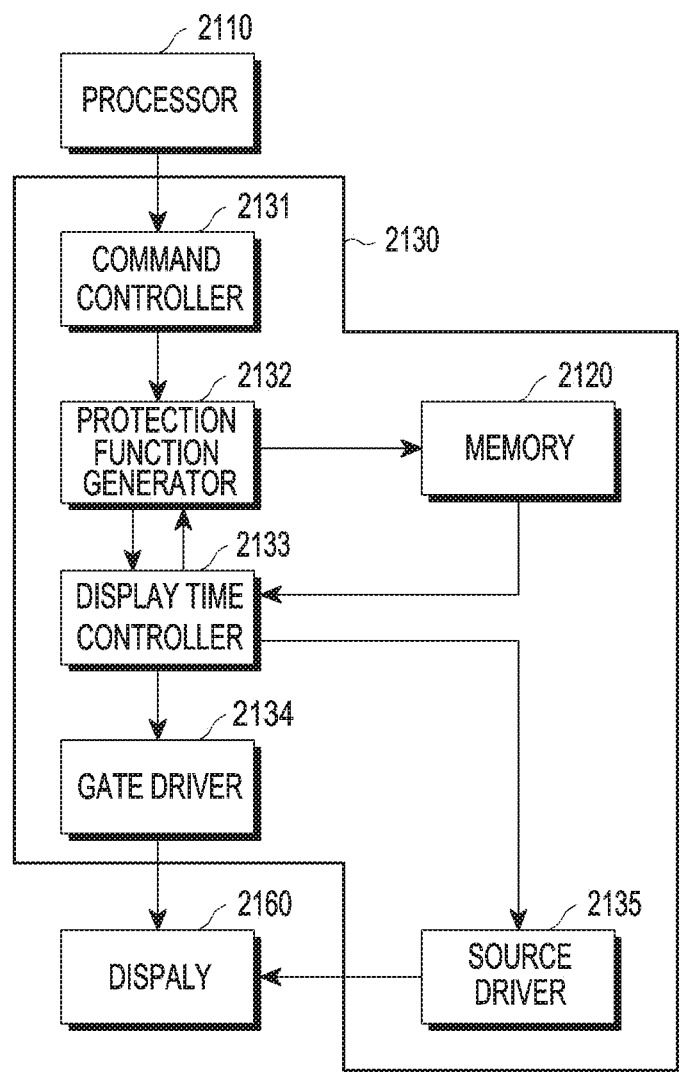
FIG. 21 illustrates components of an electronic device according to various embodiments of the present invention.

FIG. 21 illustrates components of an electronic device according to various embodiments of the present invention.

Referring to FIG. 21, according to various embodiments, an electronic device (e.g., the electronic device 101) may include a processor 2110, a display driver IC 2130, and a display 2160.

For example, the processor 2110 may obtain a frame image and control information to control the frame image based on information about the ambient environment of the electronic device 101, content included in the frame image, or an application executed by the electronic device 101.

For example, the processor 2110 may transmit the obtained control information and frame image to the display driver IC 2130.

For example, the display driver IC 2130 may include a command controller 2131, a protection function generator 2132, a display time controller 2133, a gate driver 2134, and a source driver 2135.

For example, the command controller 2131 may transfer the control information and frame image obtained from the processor 2110 to the protection function generator 2132.

For example, the protection function generator 2132 may generate a protection function (e.g., a Gaussian function) for applying a specified effect to at least a portion of the frame image, based on the control information, and transmit the protection function, along with the frame image, to the memory 2120 and the display time controller 2133.

For example, the display time controller 2133 may control the gate driver 2134 and the source driver 2135 to display the other frame image on the display 2160. For example, the display time controller 2133 may apply the specified effect to the transmitted frame image using the transmitted protection function and may display the other frame image on the display 2160 through the gate driver 2134 and the source driver 2135.

Figure 22A:
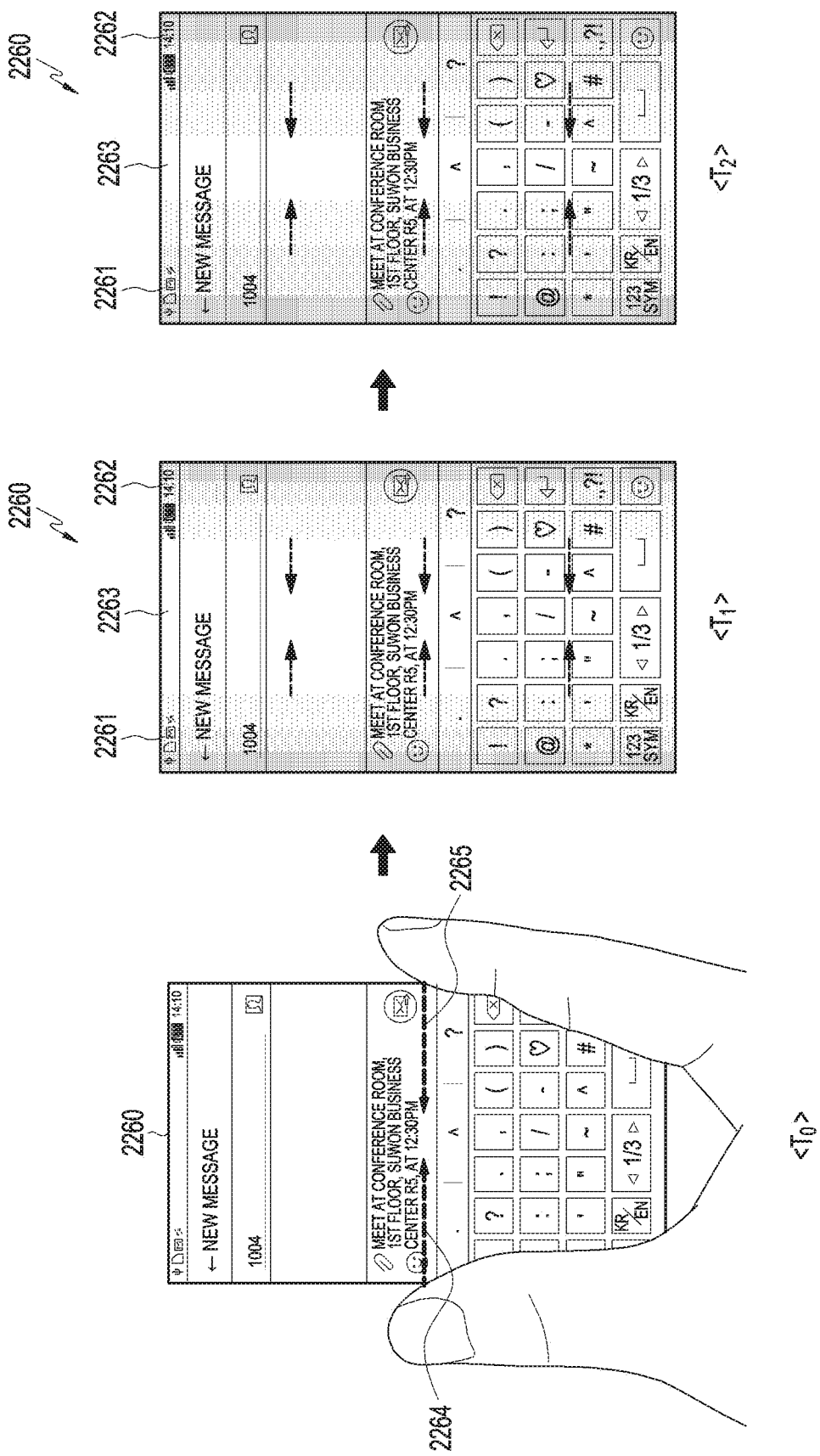
FIGS. 22a and 22b illustrate a method for applying an animation effect to a specified effect according to various embodiments of the present invention.
Figure 22B:
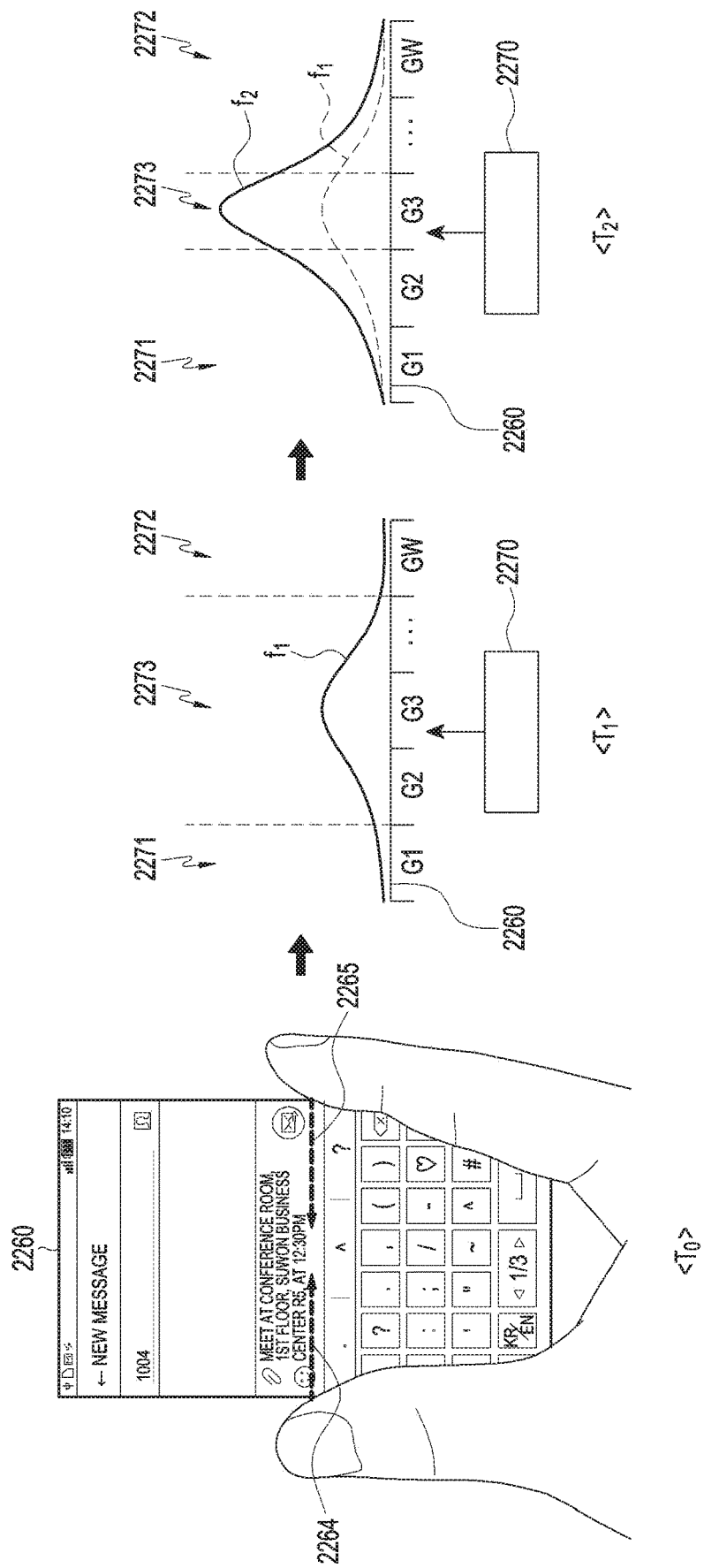

FIGS. 22*a* and 22*b* illustrate a method for applying an animation effect to a specified effect according to various embodiments of the present invention.

Referring to FIG. 22*a*, upon receiving, at $<T_0>$, a pinch-in input in a first central direction 2264 and second central direction 2265, which is directed from both edges 2264 and 2265 of the display 2260 to the center 2263, the display driver IC may apply a gradation effect to a first portion 2261 and second portion 2262, which are a smaller left and right portion, respectively, of the frame image at $<T_1>$, apply the gradation effect to the first portion 2261 and second portion 2262 in a broader range than that applied at $<T_1>$, at $<T_2>$, in order to thereby generate another frame image and display the other frame image through the display 2260.

Referring to FIG. 22*b*, for example, upon receiving a pinch-in input in a first central direction 2264 and second central direction 2265, which is directed from both edges 2264 and 2265 of the display 2260 to the center 2273 at $<T_0>$, the display driver IC may, at $<T_1>$, use a Gaussian function to output the other frame image on the display 2260 using the G1 transistor of the source driver 2270 for the left region 2271 of a first Gaussian function corresponding to the first region 2261, which is a smaller gradation-applied region, and to output the other frame image on the display 2260 using the GW transistor of the source driver 2270 for the right region 2272 of a second Gaussian function corresponding to the second region 2262, which is a smaller region.

For example, at $<T_1>$, the display driver IC may use a Gaussian function to output the other frame image on the display 2260 using the G1 and G2 transistors of the source driver 2270 for the left region 2271 of the second Gaussian function corresponding to the first region 2261, which is a larger gradation-applied region, and to output the other frame image on the display 2260 using the GW and other transistors of the source driver 2270 for the right region 2272 of the second Gaussian function corresponding to the second region 2262, which is a larger region.

Figure 23:
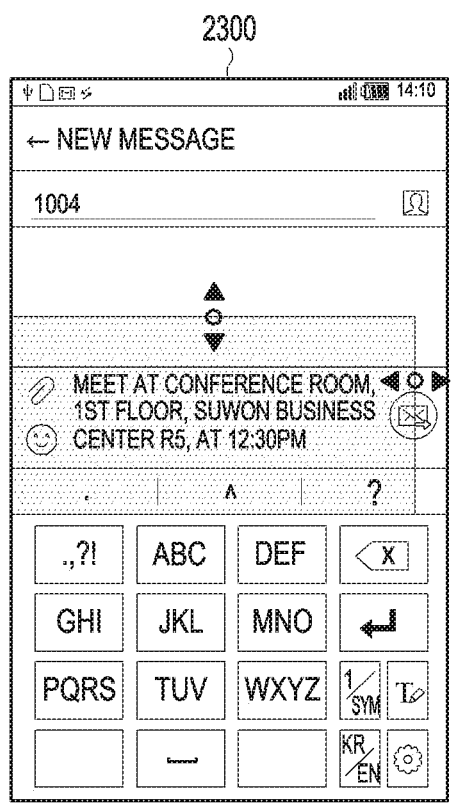
FIG. 23 illustrates an electronic device according to various embodiments of the present invention.

FIG. 23 illustrates an electronic device according to various embodiments of the present invention.

Referring to FIG. 23, according to various embodiments, an electronic device 2300 may display a frame image on a display, display a gradation effect specified portion which is moved according to the user's input among the portions of the frame image, display move guide information including information indicating that it is to be moved according to the user's input on the upper and right sides, and move the gradation effect specified portion based on the user's movement input (e.g., a drag-and-drop input) for the gradation effect specified portion.

According to various embodiments of the present invention, an electronic device may comprise a display, a processor configured to generate a frame image, and a display driver integrated circuit (IC) including an image processing module and a memory and that is configured to drive the display, wherein the display driver IC is configured to obtain the frame image from the processor, generate another frame image by applying a specified effect to at least a portion of the frame image, and display the other frame image through the display.

According to various embodiments, the display driver IC may be configured to obtain, from the processor, at least partial control information of control information related to the frame image and control at least part of generating or displaying the other frame image based on the at least partial control information.

According to various embodiments, the electronic device may further comprise another processor, wherein the display driver IC may be configured to obtain, from the other processor, at least partial control information of control information related to the frame image and control at least part of generating or displaying the other frame image based on the at least partial control information.

According to various embodiments, the electronic device may further comprise at least one sensor. The other processor may form at least part of a processor configured to control the at least one sensor.

According to various embodiments, the display driver IC may be configured to generate the other frame image when a first specified application is run on the electronic device, and abstain from generating the other frame image when a second specified application is run on the electronic device.

According to various embodiments, the display driver IC may be configured to generate the other frame image when content included in the frame image is first specified content, and abstain from generating the other frame image when the content included in the frame image is second specified content.

According to various embodiments, the display driver IC may be configured to generate the other frame image when user input meets a specified condition, and abstain from generating the other frame image when the user input does not meet the specified condition.

According to various embodiments, the display driver IC may be configured to vary the type, strength, magnitude, or pattern of the specified effect when the pressure of a touch, as the user input, meets a specified value.

According to various embodiments, the display driver IC may be configured to change the at least a portion of the frame image into a specified color using a Gaussian function.

According to various embodiments, the display driver IC may be configured to apply a gradation effect to the at least a portion of the frame image.

According to various embodiments of the present invention, a method for controlling an electronic device may comprise obtaining a frame image, generating another frame image by applying a specified effect to at least a portion of the frame image, and displaying the other frame image.

According to various embodiments, the method may comprise obtaining at least partial control information of control information related to the frame image from a processor different from an application processor that generates the frame image, and controlling at least part of generating or displaying the other frame image based on the at least partial control information.

According to various embodiments, the method may comprise obtaining at least partial control information of control information related to the frame image from an application processor that generates the frame image, and controlling at least part of generating or displaying the other frame image based on the at least partial control information.

According to various embodiments, the method may comprise generating the other frame image when a first specified application is run, and abstaining from generating the other frame image when a second specified application is run.

According to various embodiments, the method may comprise generating the other frame image when content included in the frame image is first specified content, and abstaining from generating the other frame image when the content included in the frame image is second specified content.

According to various embodiments, the method may comprise generating the other frame image when user input meets a specified condition, and abstaining from generating the other frame image when the user input does not meet the specified condition.

According to various embodiments, the method may comprise varying the type, strength, magnitude, or pattern of the specified effect when the pressure of a touch, as the user input, meets a specified value.

According to various embodiments, the method may comprise changing the at least portion of the frame image into a specified color using a Gaussian function.

According to various embodiments, the method may comprise applying a gradation effect to the at least portion of the frame image.

According to various embodiments, a camera sensor may further be included, and the specified condition may include when a person other than the user is identified by the camera sensor from around the electronic device.

According to various embodiments, the first specified application may include at least one of a photo application, video application, financial application, memo application, SNS application, messenger application, SMS application, or email application that requires the protection of personal information.

According to various embodiments, there may be provided a computer readable storage device storing instructions and a program that, when executed by at least one processor, enables the at least one processor to perform at least one operation that may include obtaining a frame image, generating another frame image by applying a specified effect to at least a portion of the frame image, and displaying the other frame image.

The invention claimed is:

1. An electronic device, comprising:
   a display;
   a display driver integrated circuit (IC) configured to drive the display; and
   a processor configured to generate a frame image and provide the fame image to the display driver IC,
   wherein the display driver IC is configured to:
      obtain the frame image from the processor,
      divide the frame image corresponding to a screen of the display into a plurality of regions vertically or horizontally, and
      apply a privacy effect to the plurality of regions, and
   wherein two adjacent regions of the plurality of regions to which the privacy effect is applied include different effect value each other.

2. The electronic device of claim 1, wherein the display driver IC is configured to obtain, from the processor, at least partial control information of control information related to the frame image and control at least part of generating or displaying the frame image which the privacy effect is applied based on the at least partial control information.

3. The electronic device of claim 1, further comprising another processor, wherein the display driver IC is configured to obtain, from the other processor, at least partial control information of control information related to the frame image and control at least part of generating or displaying the frame image to which the privacy effect is applied based on the at least partial control information.

4. The electronic device of claim 3, further comprising at least one sensor, wherein the other processor forms at least part of a processor configured to control the at least one sensor.

5. The electronic device of claim 1, wherein the display driver IC is configured to generate the frame image to which the privacy effect is applied when a first specified application is run on the electronic device and abstain from generating the frame image to which the privacy effect is applied when a second specified application is run on the electronic device.

6. The electronic device of claim 1, wherein the display driver IC is configured to generate the frame image to which the privacy effect is applied when content included in the frame image is first specified content and abstain from generating the frame image to which the privacy effect is applied when the content included in the frame image is second specified content.

7. The electronic device of claim 1, wherein the display driver IC is configured to generate the frame image to which the privacy effect is applied when a user input meets a specified condition and abstain from generating the frame image to which the privacy effect is applied when the user input does not meet the specified condition.

8. The electronic device of claim 7, wherein the display driver IC is configured to vary a kind, strength, magnitude, or pattern of the specified effect when the user input meets a specified value.

9. The electronic device of claim 1, wherein the display driver IC is configured to change the at least a portion of the frame image into a specified color using a Gaussian function.

10. The electronic device of claim 1, wherein the display driver IC is configured to apply a gradation effect to the at least a portion of the frame image.

11. A method for controlling an electronic device, the method comprising:
   obtaining, by a display driver integrated circuit (IC) of the electronic device, a frame image from a processor of the electronic device;
   dividing, by the display driver IC, the frame image corresponding to a screen of a display of the electronic device into a plurality of regions vertically or horizontally; and applying, by the display driver IC, a privacy effect to the plurality of regions, wherein two adjacent regions of the plurality of regions to which the privacy effect is applied include different effect value each other.

12. The method of claim 11, wherein the applying of the privacy effect includes obtaining at least partial control information of control information related to the frame image from an application processor that generates the frame image and controlling at least part of generating or displaying the frame image to which the privacy effect is applied based on the at least partial control information.

13. The method of claim 11, wherein the applying of the privacy effect includes obtaining at least partial control information of control information related to the frame image from a processor different from an application processor that generates the frame image and controlling at least part of generating or displaying the frame image to which the privacy effect is applied based on the at least partial control information.

14. The method of claim 13, wherein the applying of the privacy effect includes generating the other frame image when a first specified application is run and abstaining from generating the frame image to which the privacy effect is applied when a second specified application is run.

15. The method of claim 11, wherein the applying of the privacy effect includes generating the other frame image when content included in the frame image is first specified content and abstaining from generating the frame image to which the privacy effect is applied when the content included in the frame image is second specified content.

* * * * *